United States Patent
Dou et al.

(10) Patent No.: US 12,349,018 B2
(45) Date of Patent: Jul. 1, 2025

(54) CELL MEASUREMENT METHOD, MEASUREMENT APPARATUS, TERMINAL DEVICE, CHIP, AND STORAGE MEDIUM

(71) Applicant: Huawei Technologies Co., Ltd., Guangdong (CN)

(72) Inventors: Fenghui Dou, Beijing (CN); Rui Yang, Beijing (CN); Zhengbin Tan, Xi'an (CN); Hui Jin, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 432 days.

(21) Appl. No.: 17/756,598

(22) PCT Filed: Nov. 18, 2020

(86) PCT No.: PCT/CN2020/129594
§ 371 (c)(1),
(2) Date: May 27, 2022

(87) PCT Pub. No.: WO2021/104115
PCT Pub. Date: Jun. 3, 2021

(65) Prior Publication Data
US 2023/0007561 A1    Jan. 5, 2023

(30) Foreign Application Priority Data
Nov. 30, 2019 (CN) .......................... 201911208726.3

(51) Int. Cl.
*H04W 36/00* (2009.01)
*H04W 36/30* (2009.01)

(52) U.S. Cl.
CPC ... *H04W 36/0085* (2018.08); *H04W 36/0061* (2013.01); *H04W 36/302* (2023.05)

(58) Field of Classification Search
CPC ......... H04W 36/0061; H04W 36/0085; H04W 36/302; H04W 24/02; H04W 24/10;
(Continued)

(56) References Cited

U.S. PATENT DOCUMENTS

2013/0157712 A1    6/2013  Park et al.
2013/0225169 A1    8/2013  Farnsworth et al.
(Continued)

FOREIGN PATENT DOCUMENTS

CN    104041116 A    9/2014
CN    105208613 A   12/2015
(Continued)

OTHER PUBLICATIONS

XP050769943 3GPP TS 36.304 V12.0.0 (Mar. 2014),3rd Generation Partnership Project; Technical Specification Group Radio Access Network;Evolved Universal Terrestrial Radio Access (E-UTRA); User Equipment (UE) procedures in idle mode(Release 12), dated Mar. 2014, total 34 pages.

*Primary Examiner* — Mohamed A Kamara
(74) *Attorney, Agent, or Firm* — WOMBLE BOND DICKINSON (US) LLP

(57) ABSTRACT

A cell measurement method. According to the method, a terminal device determines that a first cell as a camped cell of the terminal device; and then determines that the terminal device is in a target environment. The terminal device further obtains a signal strength of the first cell and performs a measurement on a second cell when the signal strength of the first cell is less than a first threshold and greater than a second threshold. The second cell determined by the terminal device based on the target environment. The terminal device switches the camped cell of the terminal device from the first cell to the second cell when a measurement result of the second cell meets a handover condition.

20 Claims, 20 Drawing Sheets

(58) Field of Classification Search
CPC ... H04W 36/00835; H04W 36/008375; H04W 52/0245; H04W 52/0254; H04W 48/16; H04W 52/0209; Y02D 30/70
See application file for complete search history.

(56) References Cited

U.S. PATENT DOCUMENTS

| | | | |
|---|---|---|---|
| 2015/0038140 A1 | 2/2015 | Kilpatrick, II et al. | |
| 2016/0295471 A1 | 10/2016 | Song et al. | |
| 2017/0201923 A1* | 7/2017 | Yang | H04W 36/008375 |
| 2018/0332532 A1* | 11/2018 | Johansson | H04W 24/02 |
| 2023/0217337 A1* | 7/2023 | Martin | H04W 24/08 |
| | | | 370/331 |

FOREIGN PATENT DOCUMENTS

| | | | |
|---|---|---|---|
| CN | 105493551 A | 4/2016 | |
| CN | 106658618 A | 5/2017 | |
| CN | 107635264 A | 1/2018 | |
| CN | 108141801 A | 6/2018 | |
| CN | 108260136 A | 7/2018 | |
| CN | 108760136 A | 11/2018 | |
| CN | 109392040 A | 2/2019 | |
| CN | 109640250 A | 4/2019 | |
| CN | 109803337 A | 5/2019 | |
| CN | 111629337 A | 9/2020 | |
| JP | 2012191548 A | 10/2012 | |
| WO | 2014012255 A1 | 1/2014 | |

\* cited by examiner

CELL MEASUREMENT METHOD, MEASUREMENT APPARATUS, TERMINAL DEVICE, CHIP, AND STORAGE MEDIUM

CROSS REFERENCE TO RELATED APPLICATIONS

This application is a national stage of International Application No. PCT/CN2020/129594 filed on Nov. 18, 2020, which claims priority to Chinese Patent Application No. 201911208726.3, filed on Nov. 30, 2019. Both of the aforementioned applications are hereby incorporated by reference in their entireties.

TECHNICAL FIELD

This application relates to the field of mobile communications technologies, and in particular, to a cell measurement method, a measurement apparatus, a terminal device, a chip, and a storage medium.

BACKGROUND

In the conventional technology, a terminal device usually needs to take a period of time to perform inter-frequency inter-RAT neighboring cell measurement starting from a moment at which an inter-frequency measurement start condition is met to a moment at which cell reselection occurs. Continuous measurement in this period of time is mostly unnecessary. A period of time usually lasts from a moment at which the terminal device is disconnected from a network to a moment at which the terminal device finds a network again, and network search performed by the terminal device in an area without network coverage is meaningless. It can be learned that the cell measurement and the network search in the conventional technology cause relatively high power consumption of the terminal device.

SUMMARY

Embodiments of this application provide a cell measurement method, a measurement apparatus, a terminal device, a chip, and a storage medium, to resolve a problem in the conventional technology that power consumption of a terminal device is relatively high due to cell measurement and network search.

In view of this, a first aspect of this application provides a cell measurement method, and the method may include: When a terminal device camps on a first cell, if the terminal device determines that the terminal device is in a target environment, the terminal device may obtain signal strength of the first cell on which the terminal device camps. The target environment is a fixed place or a fixed route that is identified by the terminal device in advance. Then, the terminal device performs measurement on a second cell if the obtained signal strength is less than a first threshold and greater than a second threshold. The second cell is a cell determined by the terminal device based on the target environment. The terminal device performs measurement on a third cell if the obtained signal strength is less than the second threshold. The third cell includes a neighboring cell of the first cell. In this application, a cell corresponding to the target environment may be learned in advance. In this way, if the terminal device is in the target environment, and signal strength of a cell on which the terminal device currently camps is less than the first threshold and greater than the second threshold, cell measurement may be performed based on the learned cell. Therefore, invalid measurement can be effectively avoided, and power consumption of the terminal device is reduced. In addition, when the second cell does not meet a condition, the terminal device may search for the third cell, to expand a search range.

In an embodiment, the terminal device includes a first processor and a second processor. It may be understood that the first processor is configured to generate a target measurement policy, and the second processor is configured to execute the target measurement policy. The first processor of the terminal device sends the target measurement policy to the second processor of the terminal device. The target measurement policy includes at least one of the first threshold, the second threshold, and cell information corresponding to at least one second cell, the second threshold is less than the first threshold, and the cell information corresponding to the second cell includes at least one of a frequency corresponding to the second cell and a cell identifier corresponding to the second cell. In this way, the second processor may perform cell measurement based on the information included in the target measurement policy. Because the target measurement policy is a measurement policy that is corresponding to the target environment and that is learned by the terminal device in advance, invalid measurement can be effectively avoided, and power consumption of the terminal device is reduced.

In an embodiment, the terminal device determines that the terminal device is in a target environment may include: The terminal device obtains first information. If the first information matches second information, the terminal device determines that the terminal device is in the target environment. The second information is description information of the target environment, and the description information is determined by the terminal device based on the target environment. In this way, the terminal device may obtain the description information of the target environment in advance, and associate the description information with the target environment. Therefore, after obtaining the first information of the current environment, the terminal device may perform information matching based on the description information and the first information, to accurately identify whether the terminal device is in a fixed environment.

In an embodiment, the description information may be one or more of a Wi-Fi name, an identifier of a serving cell, signal strength of the serving cell, an identifier of a neighboring cell of the serving cell, and signal strength of the neighboring cell.

In an embodiment, if a measurement result of the second cell meets a cell handover condition, a cell on which the terminal device camps is handed over from the first cell to the second cell; or if a measurement result of the third cell meets a cell handover condition, a cell on which the terminal device camps is handed over from the first cell to the third cell. It may be understood that the handover herein may be understood as handover or reselection. To be specific, handover is performed when the terminal device is in a connected state, and reselection is performed when the terminal device is in an idle state. In this way, after performing cell measurement in the foregoing manner, the terminal device can quickly obtain a cell that meets the cell handover condition, thereby improving cell handover efficiency.

In an embodiment, the target measurement policy may further include a measurement priority corresponding to the at least one second cell. In this way, that the terminal device performs measurement on a second cell may include: The terminal device performs measurement on the second cell based on the measurement priority corresponding to the at least one second cell. Because the terminal device may preferentially measure a cell with a relatively high measurement priority, measurement efficiency is improved, and power consumption of the terminal is reduced.

In an embodiment, when the target environment is a fixed place, the terminal device collects information during a specified time period, and uses the collected information as the description information. There is a correspondence between the specified time period and the fixed place. In this way, because a user usually resides in the fixed place during a specific time period, the description information of the fixed place may be accurately obtained by collecting information about the time period.

In an embodiment, when the target environment is a fixed route, the terminal device collects information during a period from a moment at which the terminal device leaves a first fixed place to a moment at which the terminal device enters a second fixed place, and uses the collected information as the description information of the fixed route. In this way, because the fixed route in this application is a route formed by different fixed places, the description information of the fixed route can be accurately obtained by detecting leaving from the fixed place and entering to the fixed place.

A second aspect of this application provides a cell measurement method, and the method may include: When a terminal device camps on a first cell, if the terminal device determines that the terminal device is in a target environment, the terminal device may obtain signal strength of the first cell on which the terminal device camps. The target environment is a fixed place or a fixed route that is identified by the terminal device in advance. Then, the terminal device performs measurement on a second cell if the obtained signal strength is lower than a first threshold. The second cell is a cell determined by the terminal device based on the target environment. In this application, a cell corresponding to the target environment may be learned in advance. In this way, if the terminal device is in the target environment, and signal strength of a cell on which the terminal device currently camps is less than the first threshold, cell measurement may be performed based on the learned cell. Therefore, invalid measurement can be effectively avoided, and power consumption of the terminal device is reduced.

In an embodiment, the terminal device includes a first processor and a second processor. It may be understood that the first processor is configured to generate a target measurement policy, and the second processor is configured to execute the target measurement policy. The first processor of the terminal device sends the target measurement policy to the second processor of the terminal device. The target measurement policy includes at least one of the first threshold and cell information corresponding to at least one second cell. The cell information corresponding to the second cell includes at least one of a frequency corresponding to the second cell and a cell identifier corresponding to the second cell. In this way, the second processor may perform cell measurement based on the information included in the target measurement policy. Because the target measurement policy is a measurement policy that is corresponding to the target environment and that is learned by the terminal device in advance, invalid measurement can be effectively avoided, and power consumption of the terminal device is reduced.

In an embodiment, that the terminal device determines that the terminal device is in a target environment may include: The terminal device obtains first information. If the first information matches second information, the terminal device determines that the terminal device is in the target environment. The second information is description information of the target environment, and the description information is determined by the terminal device based on the target environment. In this way, the terminal device may obtain the description information of the target environment in advance, and associate the description information with the target environment. Therefore, after obtaining the first information of the current environment, the terminal device may perform information matching based on the description information and the first information, to accurately identify whether the terminal device is in a fixed environment.

In an embodiment, the description information may be one or more of a Wi-Fi name, an identifier of a serving cell, signal strength of the serving cell, an identifier of a neighboring cell of the serving cell, and signal strength of the neighboring cell.

In an embodiment, if a measurement result of the second cell meets a cell handover condition, a cell on which the terminal device camps is handed over from the first cell to the second cell. It may be understood that the handover herein may be understood as handover or reselection. To be specific, handover is performed when the terminal device is in a connected state, and reselection is performed when the terminal device is in an idle state. In this way, after performing cell measurement in the foregoing manner, the terminal device can quickly obtain a cell that meets the cell handover condition, thereby improving cell handover efficiency.

In an embodiment, the target measurement policy may further include a measurement priority corresponding to the at least one second cell. In this way, that the terminal device performs measurement on a second cell may include: The terminal device performs measurement on the second cell based on the measurement priority corresponding to the at least one second cell. Because the terminal device may preferentially measure a cell with a relatively high measurement priority, measurement efficiency is improved, and power consumption of the terminal is reduced.

In an embodiment, when the target environment is a fixed place, the terminal device collects information during a specified time period, and uses the collected information as the description information. There is a correspondence between the specified time period and the fixed place. In this way, because a user usually resides in the fixed place during a specific time period, the description information of the fixed place may be accurately obtained by collecting information about the time period.

In an embodiment, when the target environment is a fixed route, the terminal device collects information during a period from a moment at which the terminal device leaves a first fixed place to a moment at which the terminal device enters a second fixed place, and uses the collected information as the description information of the fixed route. In this way, because the fixed route in this application is a route formed by different fixed places, the description information of the fixed route can be accurately obtained by detecting leaving from the fixed place and entering to the fixed place.

A third aspect of embodiments of this application provides a measurement apparatus, and the measurement apparatus has functions of effectively avoiding invalid measurement and reducing power consumption of a terminal device. The function may be implemented by hardware, or may be implemented by hardware executing corresponding software. The hardware or the software includes one or more modules corresponding to the function.

A fourth aspect of embodiments of this application provides a measurement apparatus, including a processor and a memory. The processor is coupled to the memory, the memory is configured to store computer program instructions, and when the processor executes the computer program instructions, the measurement apparatus is enabled to perform the method according to any optional embodiment of the first aspect or the second aspect.

A fifth aspect of embodiments of this application provides a terminal device, including a processor and a memory. The processor is coupled to the memory, the memory is configured to store computer program instructions, and when the processor executes the computer program instructions, the terminal device is enabled to perform the method according to any optional embodiment of the first aspect or the second aspect.

A sixth aspect of embodiments of this application provides a chip. The chip is coupled to a memory in a terminal device, so that when running, the chip invokes program instructions stored in the memory, and the terminal device performs the method according to any optional embodiment of the first aspect or the second aspect.

A seventh aspect of embodiments of this application provides a computer storage medium. The computer storage medium stores program instructions, and when the program instructions are run on a terminal device, the terminal device is enabled to perform the method according to any optional embodiment of the first aspect or the second aspect.

An eighth aspect of embodiments of this application provides a computer program product including instructions. When the computer program product runs on a computer, the computer is enabled to perform the method according to any optional embodiment of the first aspect or the second aspect.

BRIEF DESCRIPTION OF DRAWINGS

To describe the technical solutions in embodiments of this application more clearly, the following briefly describes the accompanying drawings for describing the embodiments and the conventional technology. It is clearly that the accompanying drawings in the following description show merely some embodiments of this application, and other drawings may still be derived from these accompanying drawings.

DESCRIPTION OF EMBODIMENTS

To enable persons skilled in the art to better understand the technical solutions in this application, the following describes the technical solutions in embodiments of this application with reference to the accompanying drawings in embodiments of this application. It is clearly that the described embodiments are merely a part rather than all of the embodiments of this application. All embodiments based on this application shall fall within the protection scope of this application.

The technical solutions in embodiments of this application may be applied to various communications systems, for example, a global system for mobile communications (GSM), a code division multiple access (CDMA) system, a wideband code division multiple access (WCDMA) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, or a 5G system.

Structure of the Communications System

Figure 1:
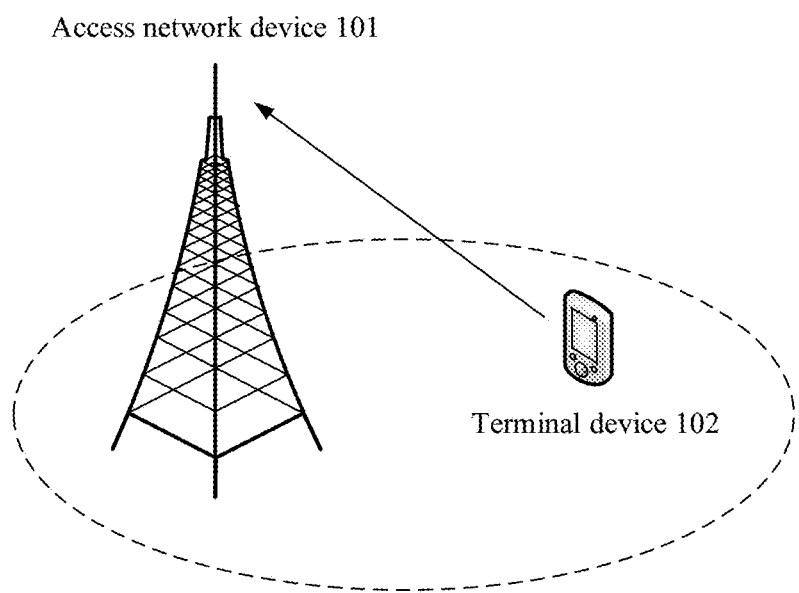
FIG. 1 is a schematic diagram of a structure of a communications system according to an embodiment of this application.

In an optional embodiment, a structure of a communications system 100 to which an embodiment of this application is applied is shown in FIG. 1. The communications system 100 may include an access network device 101 and a terminal device 102. The terminal device 102 performs communication by accessing the access network device 101.

It may be understood that the access network device 101 may be an LTE system, a next radio (NR) system, or an evolved NodeB (eNB or e-NodeB) macro base station, a micro base station (also referred to as a "small cell"), a picocell base station, an access point (AP), a transmission point (TP), a new generation base station (gNodeB), or the like in an authorized auxiliary access long term evolution (LAA-LTE) system.

It should be understood that the terminal device 102 may be referred to as user equipment (UE), a mobile station (MS), a mobile terminal, a smart terminal, or the like. The terminal device may communicate with one or more core networks through a radio access network (RAN). For example, the terminal device may be a mobile phone (or referred to as a "cellular" phone), or a computer having a mobile terminal. The terminal device may be alternatively a portable, pocket-sized, handheld, computer built-in, or in-vehicle mobile apparatus, or a terminal device in a future NR network, and the terminal device exchanges voice or data with the radio access network.

Structure of the Terminal Device

Figure 2:
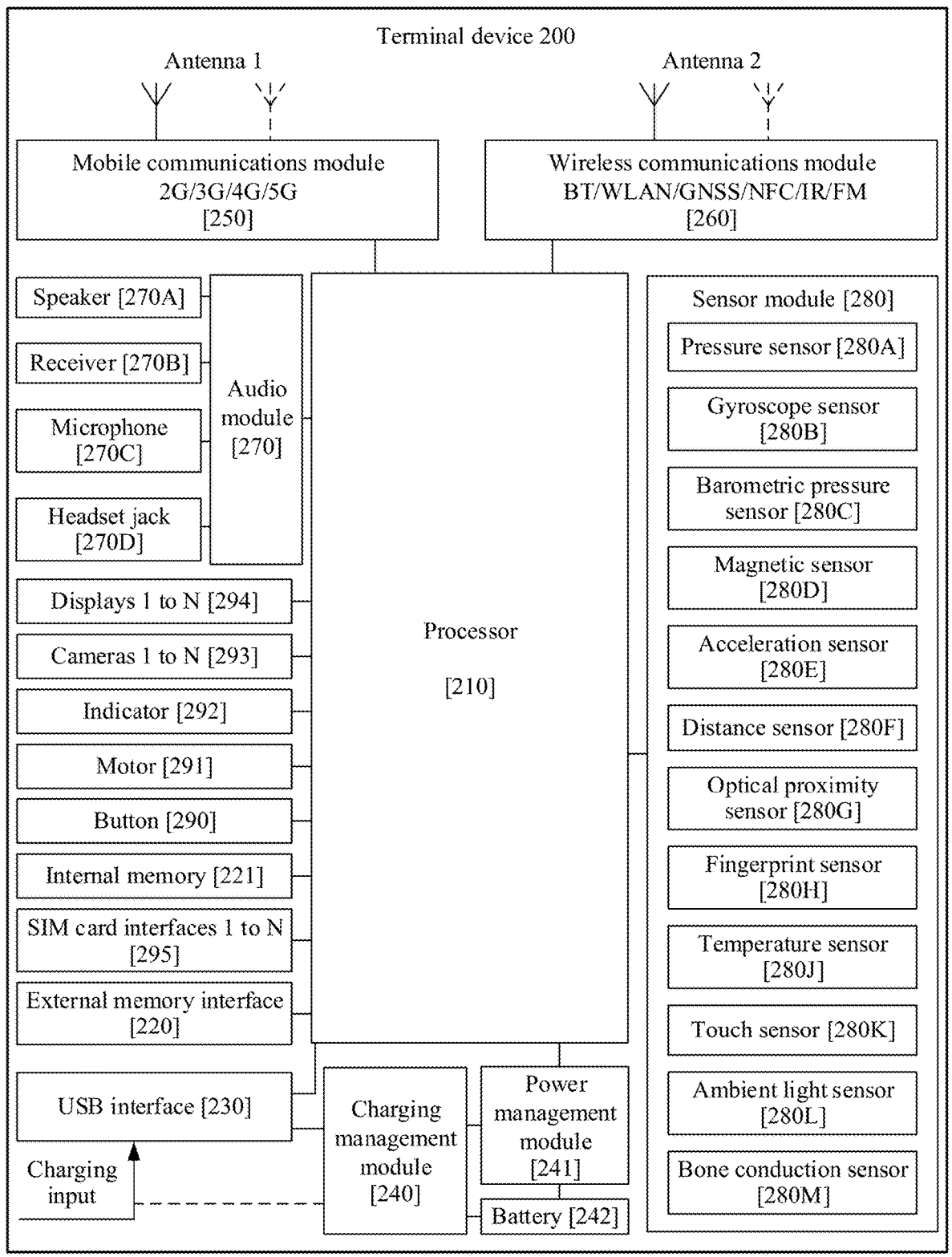
FIG. 2 is a schematic diagram of a structure of a terminal device according to an embodiment of this application.

In an embodiment, FIG. 2 is a schematic diagram of a structure of a terminal device 200 to which an embodiment of this application is applied. The terminal device 200 may include a processor 210, an external memory interface 220, an internal memory 221, a universal serial bus (USB) interface 230, a charging management module 240, a power management unit 241, a battery 242, an antenna 1, an antenna 2, a mobile communications module 250, a wireless communications module 260, an audio module 270, a speaker 270A, a receiver 270B, a microphone 270C, a headset jack 270D, a sensor module 280, a button 290, a motor 291, an indicator 292, a camera 293, a display 294, a subscriber identification module (SIM) card interface 295, and the like. The sensor module 280 may include a pressure sensor 280A, a gyroscope sensor 280B, a barometric pressure sensor 280C, a magnetic sensor 280D, an acceleration sensor 280E, a distance sensor 280F, an optical proximity sensor 280G, a fingerprint sensor 280H, a temperature sensor 280J, a touch sensor 280K, an ambient light sensor 280L, a bone conduction sensor 280M, and the like.

It can be understood that the structure shown in this embodiment of this application does not constitute a specific limitation on the terminal device 200. In some other embodiments of this application, the terminal device 200 may include more or fewer components than those shown in the figure, or combine some components, or split some components, or have different component arrangements. The components shown in the figure may be implemented in hardware, software, or a combination of software and hardware.

The processor 210 may include one or more processing units. For example, the processor 210 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent devices, or may be integrated into one or more processors.

It should be understood that, in an embodiment of this application, the processor 210 is configured to perform the following operations: When a terminal device camps on a first cell, if the terminal device determines that the terminal device is in a target environment, the terminal device obtains signal strength of the first cell on which the terminal device camps. The terminal device performs measurement on a second cell when the signal strength of the first cell is less than a first threshold and greater than a second threshold. The second cell is a cell determined by the terminal device based on the target environment. The terminal device performs measurement on a third cell when the signal strength of the first cell is less than the second threshold. The third cell includes a neighboring cell of the first cell.

In another embodiment of this application, the processor 210 is configured to perform the following operations: When a terminal device camps on a first cell, if the terminal device determines that the terminal device is in a target environment, the terminal device obtains signal strength of the first cell on which the terminal device camps. The terminal device performs measurement on a second cell when the signal strength of the first cell is less than a first threshold. The second cell is a cell determined by the terminal device based on the target environment.

The controller may be a nerve center and a command center of the terminal device 200. The controller may generate an operation control signal based on instruction operation code and a time sequence signal, to complete control of instruction fetching and instruction execution.

A memory may be further disposed in the processor 210, and is configured to store instructions and data. In some embodiments, the memory in the processor 210 is a cache. The memory may store instructions or data just used or cyclically used by the processor 210. If the processor 210 needs to use the instructions or the data again, the processor 210 may directly invoke the instructions or the data from the memory. This avoids repeated access and reduces waiting time of the processor 210, thereby improving system efficiency.

In some embodiments, the processor 210 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2S interface may be used for audio communication. In some embodiments, the processor 210 may include a plurality of groups of I2S buses. The processor 210 may be coupled to the audio module 270 through the I2S bus, to implement communication between the processor 210 and the audio module 270. In some embodiments, the audio module 270 may transfer an audio signal to the wireless communications module 260 through the I2S interface, to implement a function of answering a call by using a Bluetooth headset.

The PCM interface may also be configured to: perform audio communication, and sample, quantize, and code an analog signal. In some embodiments, the audio module 270 may be coupled to the wireless communications module 260 through a PCM bus interface. In some embodiments, the audio module 270 may alternatively transfer an audio signal to the wireless communications module 260 through the PCM interface, to implement a function of answering a call by using a Bluetooth headset. Both the I2S interface and the PCM interface may be used for audio communication.

The UART interface is a universal serial data bus, and is configured to perform asynchronous communication. The bus may be a two-way communications bus. The bus converts to-be-transmitted data between serial communication and parallel communication. In some embodiments, the UART interface is usually configured to connect the processor 210 and the wireless communications module 260. For example, the processor 210 communicates with a Bluetooth module in the wireless communications module 260 through the UART interface, to implement a Bluetooth function. In some embodiments, the audio module 270 may transfer an audio signal to the wireless communications module 260 through the UART interface, to implement a function of playing music by using a Bluetooth headset.

It can be understood that, the interface connection relationship between the modules illustrated in this embodiment of this application is merely an example for description, and does not constitute a limitation on the structure of the terminal device 200. In some other embodiments of this application, the terminal device 200 may alternatively use an interface connection mode different from that in the foregoing embodiment, or use a combination of a plurality of interface connection modes.

The charging management module 240 is configured to receive a charging input from a charger. The charger may be a wireless charger, or may be a wired charger. In some embodiments of wired charging, the charging management module 240 may receive a charging input of the wired charger through the USB interface 230. In some embodiments of wireless charging, the charging management module 240 may receive a wireless charging input through a wireless charging coil of the terminal device 200. When charging the battery 242, the charging management module 240 may further supply power to the terminal device by using the power management unit 241.

The power management unit 241 is configured to connect to the battery 242, the charging management module 240, and the processor 210. The power management unit 241 receives an input from the battery 242 and/or the charging management module 240, and supplies power to the processor 210, the internal memory 221, the external memory, the display 294, the camera 293, the wireless communications module 260, and the like. The power management unit 241 may be further configured to monitor parameters such as a battery capacity, a battery cycle count, and a battery health status (electric leakage or impedance). In some other embodiments, the power management unit 241 may alternatively be disposed in the processor 210. In some other embodiments, the power management unit 241 and the charging management module 240 may alternatively be disposed in a same device.

A wireless communication function of the terminal device 200 may be implemented through the antenna 1, the antenna 2, the mobile communications module 250, the wireless communications module 260, the modem processor, the baseband processor, and the like.

The antenna 1 and the antenna 2 are configured to transmit and receive electromagnetic wave signals. Each antenna in the terminal device 200 may be configured to cover one or more communications frequency bands. Different antennas may be multiplexed to improve utilization of the antennas. For example, the antenna 1 may be multiplexed as a diversity antenna of a wireless local area network. In some other embodiments, the antenna may be used in combination with a tuning switch.

The mobile communications module 250 may provide a wireless communication solution that includes 2G/3G/4G/5G or the like and that is applied to the terminal device 200. The mobile communications module 250 may include at least one filter, a switch, a power amplifier, a low noise amplifier (LNA), and the like. The mobile communications module 250 may receive an electromagnetic wave by using the antenna 1, perform processing such as filtering and amplification on the received electromagnetic wave, and transmit the electromagnetic wave to the modem processor for demodulation. The mobile communications module 250 may further amplify a signal modulated by the modem processor, and convert the signal into an electromagnetic wave by using the antenna 1 for radiation. In some embodiments, at least some function modules of the mobile communications module 250 may be disposed in the processor 210. In some embodiments, at least some function modules of the mobile communications module 250 and at least some modules of the processor 210 may be disposed in a same device.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal, and then transmits a processed signal to the application processor. The application processor outputs a sound signal by using an audio device (not limited to the speaker 270A, the receiver 270B, or the like), or displays an image or a video by using the display 294. In some embodiments, the modem processor may be an independent component. In some other embodiments, the modem processor may be independent of the processor 210, and disposed in a same device as the mobile communications module 250 or another function module.

The wireless communications module 260 may provide a wireless communications solution that is applied to the terminal device 200 and includes a WLAN (such as Wi-Fi), BT, a global navigation satellite system (GNSS), FM, NFC, IR, or a universal 2.4G/5G wireless communications technology. The wireless communications module 260 may be one or more devices integrating at least one communication processing module. The wireless communications module 260 receives an electromagnetic wave by using the antenna 2, performs frequency modulation and filtering on the electromagnetic wave signal, and sends the processed signal to the processor 210. The wireless communications module 260 may further receive a to-be-sent signal from the processor 210, perform frequency modulation and amplification on the to-be-sent signal, and convert the signal into an electromagnetic wave by using the antenna 2 for radiation.

In some embodiments, the wireless communications module 260 may be a Bluetooth chip. The terminal device 200 may be paired with and establish a wireless connection to a Bluetooth chip of a terminal device such as a wireless headset by using the Bluetooth chip, to implement wireless communication and service processing between the terminal device 200 and another terminal device by using the wireless connection. The wireless connection may be a physical connection or a virtual connection. The Bluetooth chip generally can support BR/EDR Bluetooth and BLE.

In some embodiments, the antenna 1 of the terminal device 200 is coupled to the mobile communications module 250, and the antenna 2 is coupled to the wireless communications module 260, so that the terminal device 200 may communicate with a network and another device by using a wireless communications technology. The wireless communications technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The terminal device 200 implements a display function by using the GPU, the display 294, the application processor, and the like. The GPU is a microprocessor for image processing, and is connected to the display 294 and the application processor. The GPU is configured to perform mathematical and geometrical calculation, and is configured to perform graphics rendering. The processor 210 may include one or more GPUs that execute program instructions to generate or change display information.

The display 294 is configured to display an image, a video, and the like. The display 294 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some embodiments, the terminal device 200 may include one or N displays 294, where N is a positive integer greater than 1.

The terminal device 200 can implement a photographing function by using the ISP, the camera 293, the video codec, the GPU, the display 294, the application processor, and the like.

The ISP is configured to process data fed back by the camera 293. For example, during photographing, a shutter is opened, light is transferred to a camera photosensitive element through a lens, an optical signal is converted into an electrical signal, and the electrical signal is transferred to the ISP for processing and is converted into an image that is visible to a naked eye. The ISP may further perform algorithm optimization on noise, luminance, and complexion of the image. The ISP may further optimize parameters such as exposure and a color temperature of a photographing scenario. In some embodiments, the ISP may be disposed in the camera 293.

The camera 293 is configured to capture a still image or a video. An optical image of an object is generated through the lens, and the image is projected to the photosensitive element. The photosensitive element may be a charge coupled device (CCD) or a complementary metal-oxide-semiconductor (CMOS) phototransistor. The photosensitive element converts an optical signal into an electrical signal, and then transfers the electrical signal to the ISP, so that the ISP converts the electrical signal into a digital image signal. The ISP outputs the digital image signal to the DSP for processing. The DSP converts the digital image signal into an image signal in a standard format, for example, RGB or YUV. In some embodiments, the terminal device 200 may include one or N cameras 293, where N is a positive integer greater than 1.

The digital signal processor is configured to process a digital signal, and in addition to a digital image signal, may further process another digital signal. For example, when the terminal device 200 selects a frequency, the digital signal processor is configured to perform Fourier Transform on frequency energy.

The video codec is configured to compress or decompress a digital video. The terminal device 200 may support one or more video codecs. In this way, the terminal device 200 may play or record videos in a plurality of encoding formats, for example, moving picture experts group (MPEG)-1, MPEG-2, MPEG-2, and MPEG-4.

The NPU is a neural-network (NN) computing processor. The NPU quickly processes input information with reference to a structure of a biological neural network, for example, with reference to a transfer mode between human brain neurons, and may further continuously perform self-learning. The NPU may be used to implement intelligent cognition of the terminal device 200 and other applications, for example, image recognition, facial recognition, speech recognition, and text understanding.

The external memory interface 220 may be configured to connect to an external storage card, for example, a micro SD card, to extend a storage capability of the terminal device 200. The external memory card communicates with the processor 210 through the external memory interface 220, to implement a data storage function. For example, files such as music and videos are stored in the external memory card.

The internal memory 221 may be configured to store computer executable program code, where the executable program code includes instructions. The processor 210 executes various function applications and data processing of the terminal device 200 by running the instructions stored in the internal memory 221. The internal memory 221 may include a program storage area and a data storage area. The program storage area may store an operating system, an application required by at least one function (for example, a sound playing function or an image playing function), and the like. The data storage area may store data (for example, audio data or a phone book) created during use of the terminal device 200, and the like. In addition, the internal memory 221 may include a high-speed random access memory, and may further include a nonvolatile memory, for example, at least one magnetic disk storage device, a flash memory device, or a universal flash storage (UFS).

The processor 210 may be configured to execute the foregoing program code, and invoke related modules to implement functions of the terminal device in embodiments of this application. The functions include, for example, pairing with a wireless headset; when there is an audio service, sending connection request information to the wireless headset based on a priority of the audio service; and establishing/disconnecting a physical or virtual connection between the terminal device and the wireless headset.

The terminal device 200 may implement an audio function such as music playback or recording through the audio module 270, the speaker 270A, the receiver 270B, the microphone 270C, the headset jack 270D, the application processor, and the like.

The audio module 270 is configured to convert digital audio information into an analog audio signal for output, and is also configured to convert an analog audio input into a digital audio signal. The audio module 270 may be further configured to code and decode an audio signal. In some embodiments, the audio module 270 may be disposed in the processor 210, or some function modules in the audio module 270 are disposed in the processor 210.

The speaker 270A, also referred to as a "loudspeaker", is configured to convert an audio electrical signal into a sound signal. The terminal device 200 may listen to music or answer a call in a hands-free mode over the speaker 270A.

The receiver 270B, also referred to as an "earpiece", is configured to convert an audio electrical signal into a sound signal. When the terminal device 200 is used to answer a call or listen to voice information, the receiver 270B may be placed close to a human ear to listen to a voice.

The microphone 270C, also referred to as a "mike" or a "mic", is configured to convert a sound signal into an electrical signal. When making a call or sending voice information, a user may make a sound by moving a human mouth close to the microphone 270C to input a sound signal to the microphone 270C. At least one microphone 270C may be disposed in the terminal device 200. In some other embodiments, two microphones 270C may be disposed in the terminal device 200, to implement a noise reduction function, in addition to collecting a sound signal. In some other embodiments, three, four, or more microphones 270C may be alternatively disposed in the terminal device 200, to collect a sound signal and reduce noise. The microphones 270C may further identify a sound source, implement a directional recording function, and the like.

The headset jack 270D is configured to connect to a wired headset. The headset jack 270D may be the USB interface 230, or may be a 2.5 mm open mobile terminal platform (OMTP) standard interface or a cellular telecommunications industry association of the USA (CTIA) standard interface.

The pressure sensor 280A is configured to sense a pressure signal, and may convert the pressure signal into an electrical signal. In some embodiments, the pressure sensor 280A may be disposed on the display 294. There are many types of pressure sensors 280A such as a resistive pressure sensor, an inductive pressure sensor, and a capacitive pressure sensor. The capacitive pressure sensor may include at least two parallel plates made of conductive materials. Capacitance between electrodes changes when a force is applied to the pressure sensor 280A. The terminal device 200 determines pressure intensity based on the capacitance change. When a touch operation is performed on the display 294, the terminal device 200 detects intensity of the touch operation based on the pressure sensor 280A. The terminal device 200 may also calculate a touch position based on a detection signal of the pressure sensor 280A. In some embodiments, touch operations that are performed at a same touch position but have different touch operation intensity may correspond to different operation instructions. For example, when a touch operation whose touch operation intensity is less than a first pressure threshold is performed on a Messages icon, an instruction for viewing an SMS message is executed. When a touch operation whose touch operation intensity is greater than or equal to the first pressure threshold is performed on the Messages icon, an instruction for creating an SMS message is executed.

The gyroscope sensor 280B may be configured to determine a motion posture of the terminal device 200. In some embodiments, angular velocities of the terminal device 200 around three axes (that is, x, y, and z axes) may be determined by using the gyroscope sensor 280B. The gyroscope sensor 280B may be used for image stabilization during photographing. For example, when the shutter is pressed, the gyroscope sensor 280B detects a shake angle of the terminal device 200, calculates, based on the angle, a distance that needs to be compensated by a lens module, and enables the lens to counteract the shake of the terminal device 200 by performing reverse motion, thereby implementing image stabilization. The gyroscope sensor 280B may also be used for scenarios of navigation and motion sensing games.

The barometric pressure sensor 280C is configured to measure atmospheric pressure. In some embodiments, the terminal device 200 calculates an altitude by using a barometric pressure value measured by the barometric pressure sensor 280C, to assist in positioning and navigation.

The magnetic sensor 280D includes a Hall sensor. The terminal device 200 may detect opening and closing of a flip cover by using the magnetic sensor 280D. In some embodiments, when the terminal device 200 is a flip phone, the terminal device 200 may detect opening and closing of a flip cover based on the magnetic sensor 280D. Further, a feature such as automatic unlocking upon opening of the flip cover is set based on a detected opening or closing state of the flip cover.

The acceleration sensor 280E may detect magnitudes of accelerations of the terminal device 200 in various directions (usually on three axes). A magnitude and a direction of gravity may be detected when the terminal device 200 is stationary. The acceleration sensor 280E may be further configured to identify a posture of the terminal device, and is used in an application such as switching between a landscape mode and a portrait mode or a pedometer.

The distance sensor 280F is configured to measure a distance. The terminal device 200 may measure a distance by using infrared light or a laser. In some embodiments, in a photographing scenario, the terminal device 200 may measure a distance by using the distance sensor 280F, to implement fast focusing.

The optical proximity sensor 280G may include a light-emitting diode (LED) and an optical detector, for example, a photodiode. The light-emitting diode may be an infrared light-emitting diode. The terminal device 200 emits infrared light outwards by using the light-emitting diode. The terminal device 200 detects infrared reflected light from a nearby object by using the photodiode. When detecting plenty of reflected light, the terminal device 200 may determine that there is an object near the terminal device 200. When detecting inadequate reflected light, the terminal device 200 may determine that there is no object near the terminal device 200. The terminal device 200 may detect, by using the optical proximity sensor 280G, that the user holds the terminal device 200 close to an ear for a call, so that the terminal device 200 automatically turns off the screen to save power. The optical proximity sensor 280G may also be used for automatic screen unlocking and locking in a smart cover mode or a pocket mode.

The ambient light sensor 280L is configured to sense ambient light brightness. The terminal device 200 may adaptively adjust brightness of the display 294 based on the sensed ambient light brightness. The ambient light sensor 280L may also be configured to automatically adjust white balance during photographing. The ambient light sensor 280L may also cooperate with the optical proximity sensor 280G to detect whether the terminal device 200 is in a pocket to prevent an accidental touch.

The fingerprint sensor 280H is configured to collect a fingerprint. The terminal device 200 may implement fingerprint-based unlocking, unlocking for application access, fingerprint-based photographing, fingerprint-based call answering, and the like by using a collected fingerprint characteristic.

The temperature sensor 280J is configured to detect a temperature. In some embodiments, the terminal device 200 executes a temperature processing policy by using the temperature detected by the temperature sensor 280J. For example, when the temperature reported by the temperature sensor 280J exceeds a threshold, the terminal device 200 lowers performance of a processor located near the temperature sensor 280J, to reduce power consumption and implement thermal protection. In some other embodiments, when the temperature is lower than another threshold, the terminal device 200 heats the battery 242, to avoid abnormal shutdown of the terminal device 200 caused by a low temperature. In some other embodiments, when the temperature is lower than still another threshold, the terminal device 200 boosts an output voltage of the battery 242, to avoid abnormal shutdown caused by a low temperature.

The touch sensor 280K is also referred to as a "touch panel". The touch sensor 280K may be disposed on the display 294. The touch sensor 280K and the display 294 form a touchscreen, which is also referred to as a "touchscreen". The touch sensor 280K is configured to detect a touch operation performed on or near the touch sensor 280K. The touch sensor may transfer the detected touch operation to the application processor to determine a type of a touch event. The display 294 may provide a visual output related to the touch operation. In some other embodiments, the touch sensor 280K may alternatively be disposed on a surface of the terminal device 200 in a position different from that of the display 294.

The bone conduction sensor 280M may obtain a vibration signal. In some embodiments, the bone conduction sensor 280M may obtain a vibration signal of a vibration bone of a human vocal part. The bone conduction sensor 280M may also contact a pulse of a human body and receive a blood pressure pulse signal. In some embodiments, the bone conduction sensor 280M may also be disposed in the headset, to combine into a bone conduction headset. The audio module 270 may parse out a voice signal based on the vibration signal of the vibration bone of the vocal part that is obtained by the bone conduction sensor 280M, to implement a voice function. The application processor may parse heart rate information based on the blood pressure beating signal obtained by the bone conduction sensor 280M, to implement a heart rate detection function.

The button 290 includes a power button, a volume button, or the like. The button 290 may be a mechanical button, or may be a touch-sensitive button. The terminal device 200 may receive a key input, and generate a key signal input related to a user setting and function control of the terminal device 200.

The motor 291 may generate a vibration prompt. The motor 291 may be used for an incoming call vibration prompt, or may be used for touch vibration feedback. For example, touch operations performed on different applications (for example, photographing and audio playing) may correspond to different vibration feedback effects. The motor 291 may also generate different vibration feedback effects for touch operations performed on different areas of the display 294. Different application scenarios (for example, a time prompt, information receiving, an alarm clock, and a game) may also correspond to different vibration feedback effects. A touch vibration feedback effect may be further customized.

The indicator 292 may be an indicator light, and may be configured to indicate a charging status and a battery level change, or may be configured to indicate a message, a missed call, a notification, and the like.

The SIM card interface 295 is configured to connect to a SIM card. The SIM card may be inserted into the SIM card interface 295 or removed from the SIM card interface 295, to implement contact with or separation from the terminal device 200. The terminal device 200 may support one or N SIM card interfaces, where N is a positive integer greater than 1. The SIM card interface 295 may support a nano-SIM card, a micro-SIM card, a SIM card, and the like. A plurality of cards may be simultaneously inserted into a same SIM card interface 295. The plurality of cards may be of a same type or different types. The SIM card interface 295 may also be compatible with different types of SIM cards. The SIM card interface 295 may also be compatible with the external storage card. The terminal device 200 interacts with a network by using the SIM card, to implement functions such as a call and data communication. In some embodiments, the terminal device 200 uses an eSIM, that is, an embedded SIM card. The eSIM card may be embedded in the terminal device 200, and cannot be separated from the terminal device 200.

It should be noted that the terminal device in this application may include a device such as a mobile phone, a tablet computer, a notebook computer, an ultra-mobile personal computer (UMPC), a handheld computer, a netbook, a personal digital assistant (PDA), a wearable terminal device, or a smartwatch. A specific form of the terminal device is not specially limited in embodiments of this application.

Operating System Architecture:

The terminal device in this application may run an Android operating system, an iOS operating system, or another operating system. This is not limited in this application.

Figure 3:
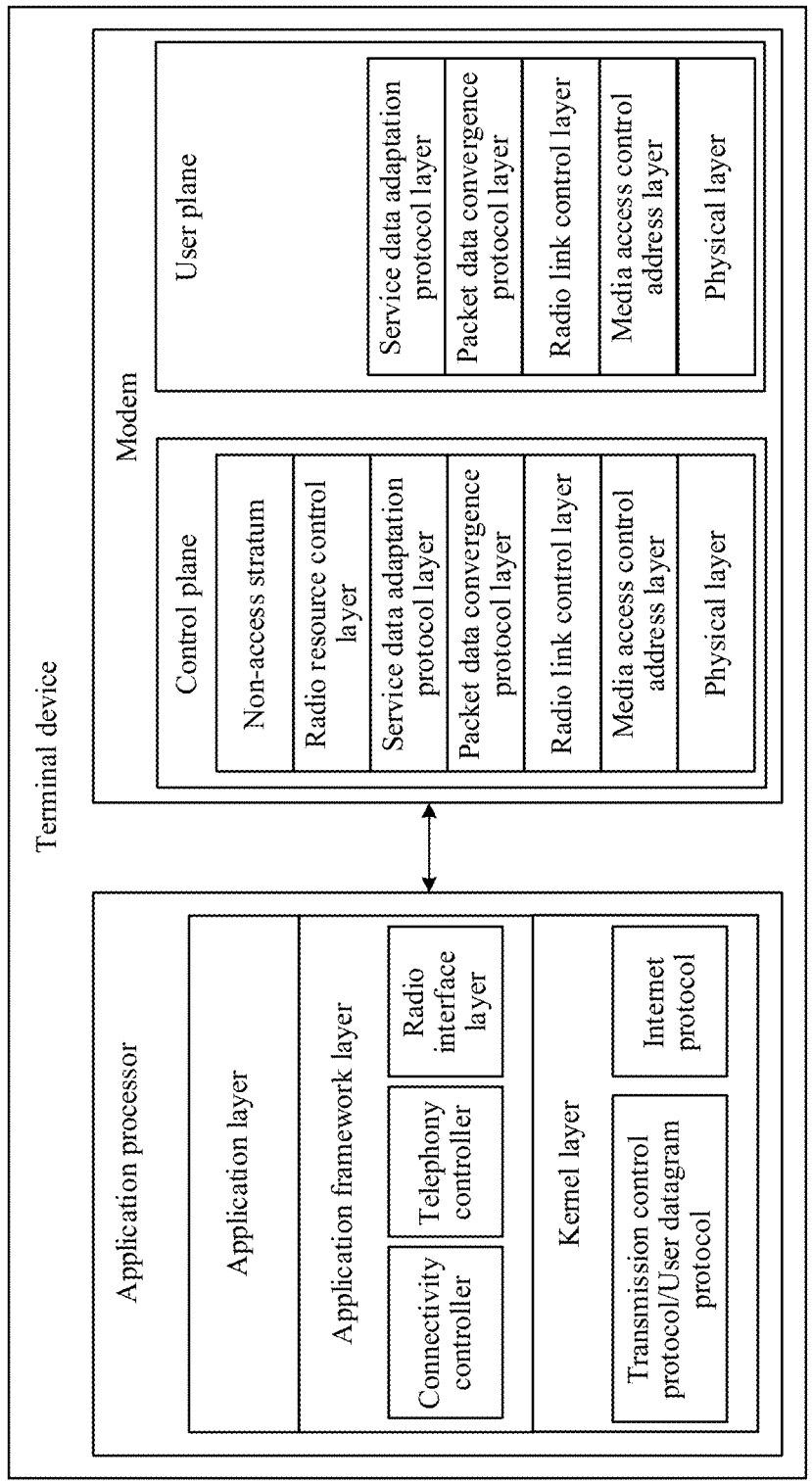
FIG. 3 is an architectural diagram of an operating system of a terminal device according to an embodiment of this application.

The following uses an Android operating system as an example for description. FIG. 3 is a block diagram of a structure of a terminal device running an Android operating system according to an embodiment of this application. In FIG. 3, the terminal device may include two parts: an application processor and a modem, and information is exchanged between the application processor and the modem.

An architecture of the application processor mainly includes three layers: an application layer, an application framework layer, and a kernel layer (for example, a linux kernel layer).

Further, the application layer includes various applications (for example, a system application and a third-party application) in the Android operating system.

The application framework layer is an application framework, and a developer may develop some applications based on the application framework layer when following a development rule of the application framework. The application framework layer may include a connectivity manager, a telephony manager, a radio interface layer (RIL), and the like.

The kernel layer is an operating system layer of the Android operating system. The kernel layer may provide a core system service and a hardware-related driver for the Android operating system based on a Linux kernel.

As shown in FIG. 3, the modem may include a communications protocol stack, and includes a control plane protocol stack and a user plane protocol stack. The user plane protocol stack is a protocol cluster used for user data transmission, and the control plane protocol stack is a protocol cluster used for control signaling transmission of the system.

The control plane protocol stack includes a non-access stratum (NAS), a radio resource control (RRC) layer, a service data adaptation protocol (SDAP) layer, a packet data convergence protocol (PDCP) layer, a radio link control (RLC) layer, a media access control address (MAC) layer, a physical layer (PHY), and the like. The user plane protocol stack may include a service data adaptation protocol layer, a packet data convergence protocol layer, a radio link control layer, a media access control address layer, a physical layer, and the like.

Embodiments of this application may run in the operating system architecture shown in FIG. 3.

It may be understood that the terminal device pre-stores a preset network selection policy (which is equivalent to a preset measurement policy or a preset network search policy in this application) at the application framework layer or in the modem. If the preset network selection policy is stored at the application framework layer, because an adapter (not shown in FIG. 3) that matches the RIL is disposed in the modem, the preset network selection policy at the application framework layer may be transmitted to the NAS through communication between the adapter in the modem and the RIL. In this way, in this application, a process of obtaining a target network selection policy (which is equivalent to a target measurement policy or a target network search policy in this application) may be performed in the NAS, and after the target network selection policy is obtained, network selection processing is performed in the RRC based on the target network selection policy (which is equivalent to cell measurement or network search in this application).

In the conventional technology, power consumption of the terminal device includes power consumption generated by the application processor and the modem. The power consumption of the modem is mainly reflected in standby power consumption and data service power consumption. The standby power consumption and the data service power consumption may be caused by factors such as network search and cell measurement.

The network search in the conventional technology may include a plurality of cases. For example, the terminal device may periodically obtain a signal level value or a signal quality value of a current cell on which the terminal device camps. If it is determined, based on the obtained signal level value or signal quality value, that the terminal device meets an inter-frequency measurement start condition, the terminal device performs measurement on an inter-frequency neighboring cell or an inter-RAT neighboring cell. For another example, when the terminal device is disconnected from a network, the terminal device continuously searches for a network in turn. For another example, if a network on which the terminal device currently camps is not a highest-standard network supported by the terminal device, the terminal device continuously searches for the highest-standard network. For example, the highest-standard network supported by the terminal device is 4G. If the network on which the terminal device currently camps is a 3G network, the terminal device continuously searches for the 4G network. The foregoing inter-frequency measurement start condition may be Srxlev<=SnonIntraSearchP or Squal<=SnonIntraSearchQ. Srxlev indicates an obtained signal level value, Squal indicates an obtained signal quality value, SnonIntraSearchP indicates a level threshold for inter-frequency and inter-RAT measurement, and SnonIntraSearchQ indicates a quality threshold for inter-frequency and inter-RAT measurement. Definitions of the involved parameters are the same as those in 3GPP TS 36.304.

The network search in the conventional technology has the following disadvantage: A terminal device usually needs to take a period of time to perform measurement on an inter-frequency neighboring cell and an inter-RAT neighboring cell starting from a moment at which an inter-frequency measurement start condition is met to a moment at which cell reselection is performed. Continuous measurement in this period of time is mostly unnecessary. Consequently, a waste of system resources is caused, and power consumption of the terminal device is relatively high. In addition, the terminal device may be in an area without network coverage in a time period from a moment at which the terminal device is disconnected from a network to a moment at which the terminal device finds a network again. In this case, continuous network searching causes a waste of system resources and a large amount of power consumption, and the terminal device cannot connect to the network. Consequently, this is meaningless. In addition, some areas may have only 3G network coverage but not 4G network coverage. When the terminal device is located in these areas, continuous searching for the 4G network by the terminal device only wastes a large amount of power consumption, and is meaningless.

In this application, a wireless network signal feature of a fixed route or a fixed place is learned, identified, and predicted, to optimize network search, cell measurement, and the like of a terminal, thereby reducing power consumption of the terminal.

Embodiments of this application provide a plurality of different implementation solutions, which are separately described below.

Technical Solution of Cell Measurement[TX(1]

Figure 4:
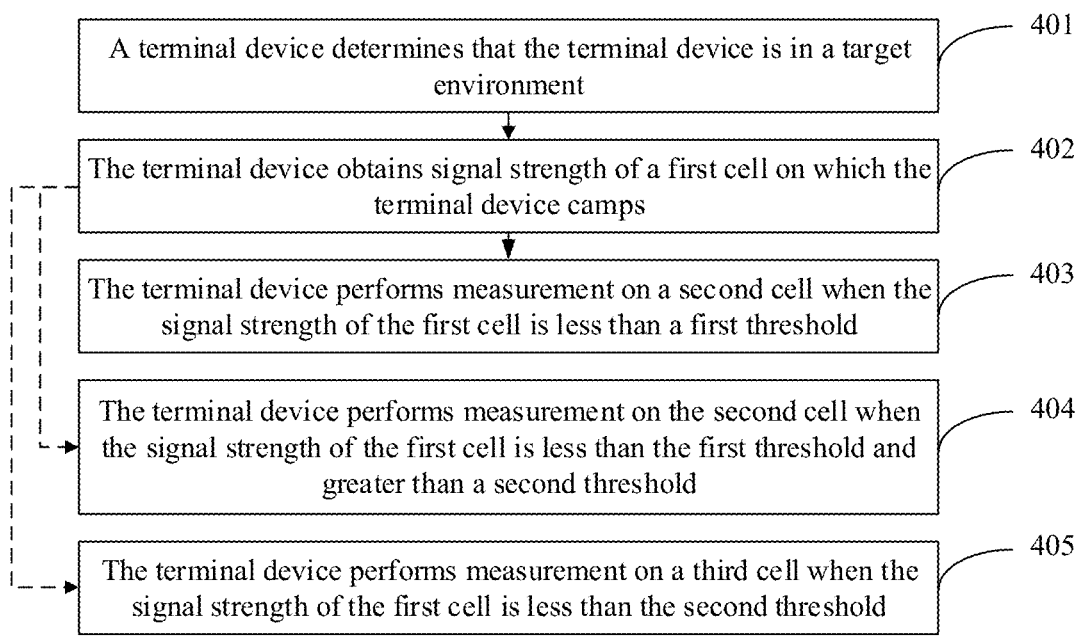
FIG. 4 is a schematic flowchart of a cell measurement method according to an embodiment of this application.

FIG. 4 is a schematic flowchart of a cell measurement method according to an embodiment of this application. The method is applied to a terminal device. In some embodiments, a user may enable an intelligent network selection function in the manner shown in FIG. 10B, FIG. 10D, or FIG. 10E, and then the terminal device performs the cell measurement method in this application. In some other embodiments, the terminal device may also automatically perform the cell measurement method shown in this embodiment of this application. In some other embodiments, when the terminal device detects that network signal quality is relatively poor, the terminal device may prompt the user whether to perform the cell measurement method shown in this embodiment of this application. A manner of starting cell measurement is not limited in this embodiment of this application.

When the terminal device is properly connected to an access network device, the terminal device selects a cell to camp on. An example in which the terminal device camps on a first cell is used below for description.

As shown in FIG. 4, the cell measurement method in this embodiment of this application may include the following operations.

401: The terminal device determines that the terminal device is in a target environment.

After the cell measurement solution provided in this embodiment of this application is enabled, the terminal device determines whether the terminal device is currently in the target environment.

The target environment is a fixed place or a fixed route that is identified by the terminal device in advance. The fixed place or the fixed route is related to user behavior. For example, the fixed place is a place that the user frequently moves, for example, a home or an office; and the fixed route is a route that the user frequently travels, for example, a route that the user commutes.

In some embodiments, the target environment may be identified by the terminal device by using collected description information. For example, the terminal device may obtain information about the fixed place or the fixed route in an application.

The terminal device determines the target environment in a plurality of manners.

In some embodiments, the terminal device may assume that the user is located in a fixed place within a time period. For example, it may be assumed that the user is at home from 8:00 p.m. to 6:00 a.m.[[.]] For another example, it may be assumed that the user is in the office from 9:00 a.m. to 12:00 a.m.[[.]]

In some other embodiments, the terminal device may assume that the user is on a fixed route when leaving a fixed place. For example, it may be assumed that when the terminal device leaves home, the user is in a route between home and the office.

In some other embodiments, the terminal device may assume that the user is on a fixed route when leaving a fixed place within a specific time period. For example, it may be assumed that when the terminal device leaves home from 7 a.m. to 8 a.m., the user is in the route between home and the office.

In some other embodiments, the terminal device may obtain first information, and then determine whether the first information matches second information. If the first information matches the second information, the terminal device may determine that the terminal device is in the target environment.

The first information may be information about a current environment in which the terminal device is located. In some embodiments, the first information may be cell information of a cell on which the terminal device currently camps. In some other embodiments, the first information may be a name (which may also be referred to as a service set identifier (SSID)) of a Wi-Fi to which the terminal device currently connects. Specific content of the first information is not limited in this embodiment of this application.

It may be understood that the second information is description information of the target environment, and the description information of the target environment may include at least one of description information of a cell and description information of a wireless fidelity (Wi-Fi).

It should be understood that the description information of the target environment is determined by the terminal device based on the target environment. For a manner of collecting the description information, refer to a subsequent embodiment. Details are not described herein.

Further, the description information of the cell may include description information of one or more cells.

It should be noted that the description information of the cell may include but is not limited to one or more of an identifier (which may also be referred to as a mobile network cell signal fingerprint) of a serving cell, signal strength of the serving cell, an identifier of a neighboring cell of the serving cell, and signal strength of the neighboring cell.

The description information of the Wi-Fi may include description information of one or more Wi-Fis.

It should be noted that the description information of the Wi-Fi may include but is not limited to one or more of a Wi-Fi name and signal strength of the Wi-Fi. The Wi-Fi name may include at least one of a name of the Wi-Fi to which the terminal device connects and a name of another Wi-Fi that can be scanned when the terminal device connects to the Wi-Fi. The signal strength of the Wi-Fi may include at least one of signal strength of the Wi-Fi and signal strength of the another Wi-Fi.

For example, if the first information obtained by the terminal device is at least one of signal strength, an identifier, and a name, the terminal device may determine whether the first information correspondingly matches at least one of signal strength, an identifier, and a name included in the second information. If at least one matching exists, the terminal device may determine that the terminal device is in the target environment. The at least one matching may include: signal strength matching, or identifier matching, or name matching, or signal strength and identifier matching, or identifier and name matching, or signal strength and name matching, or signal strength, identifier, and name matching.

If the first information obtained by the terminal device is the signal strength, the terminal device may determine whether the signal strength is close to the signal strength included in the second information. If the signal strength is close to the signal strength included in the second information, it may be considered that the signal strength matches.

If the first information obtained by the terminal device is the identifier, the terminal device may determine whether the identifier is the same as the identifier included in the second information. If the identifier is the same as the identifier included in the second information, it may be considered that the identifiers match.

If the first information obtained by the terminal device is the name, the terminal device may determine whether the name is the same as the name included in the second information. If the name is the same as the name included in the second information, it may be considered that the names match.

402: The terminal device obtains signal strength of the first cell on which the terminal device camps.

When the terminal device determines that the terminal device is in the target environment, the terminal device may obtain the signal strength of the first cell on which the terminal device currently camps.

In this embodiment of this application, the signal strength may include reference signal received power (RSRP).

Certainly, the signal strength in this application may alternatively be a signal quality value. Correspondingly, a threshold subsequently used may be a threshold corresponding to the signal quality value. The signal quality value may include the following parameters: a signal to interference plus noise ratio (SINR), reference signal received power (RSRP), reference signal received quality (RSRQ), or a received signal strength indication (RSSI).

403: The terminal device performs measurement on a second cell when the signal strength of the first cell is less than a first threshold.

The terminal device may perform measurement on the second cell if the signal strength of the first cell obtained by the terminal device is less than the first threshold.

The second cell is a cell that is identified and determined by the terminal device through learning in advance based on a network signal feature of the target environment.

In some embodiments, the first threshold and cell information corresponding to at least one second cell may be obtained from a target measurement policy. The target measurement policy may be generated by a first processor, and then sent to a second processor. The second processor is configured to execute the target measurement policy. The first processor and the second processor may be a same processor, or may be different processors.

It may be understood that the cell information corresponding to the second cell includes at least one of a frequency corresponding to the second cell and a cell identifier corresponding to the second cell.

Further, the target measurement policy may further include a measurement priority corresponding to the at least one second cell.

For example, the second cell in the target measurement policy includes measurement priorities of a cell 1, a cell 2, and a cell 3. For example, the measurement priorities of the cell 1, the cell 2, and the cell 3 are in descending order. Therefore, in a subsequent cell measurement process, the cell 1 may be measured first, then the cell 2 is measured, and finally the cell 3 is measured.

In some optional embodiments, after operation 403, this embodiment of this application may further include: when a measurement result of the second cell meets a cell handover condition, a cell on which the terminal device camps is handed over from the first cell to the second cell.

It may be understood that the handover in this application may include reselection and handover. If the terminal device performs handover, the terminal device further needs to report a measurement report to a network.

In an embodiment, after operation 402 is performed, operation 404 may be further performed.

404: The terminal device performs measurement on the second cell when the signal strength of the first cell is less than the first threshold and greater than a second threshold.

When the signal strength of the first cell is less than the first threshold, the terminal device may further determine whether the signal strength of the first cell is greater than the second threshold. If the signal strength of the first cell is greater than the second threshold, the terminal device may perform measurement on the second cell.

The second cell is a cell selected from cells that are specified in an existing standard and need to be measured.

Figure 5:
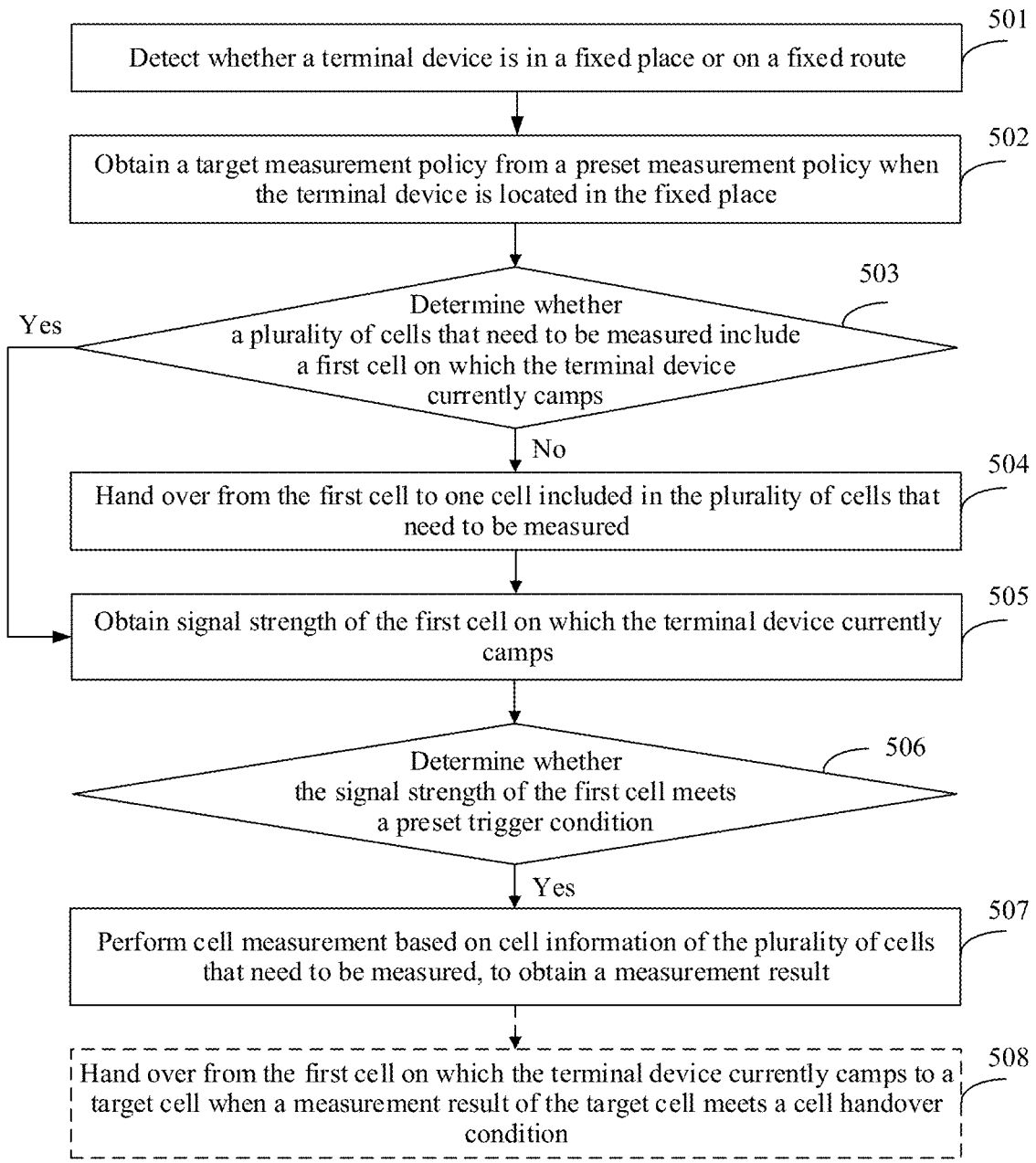
FIG. 5 is a schematic flowchart of another cell measurement method according to an embodiment of this application.
Figure 6:
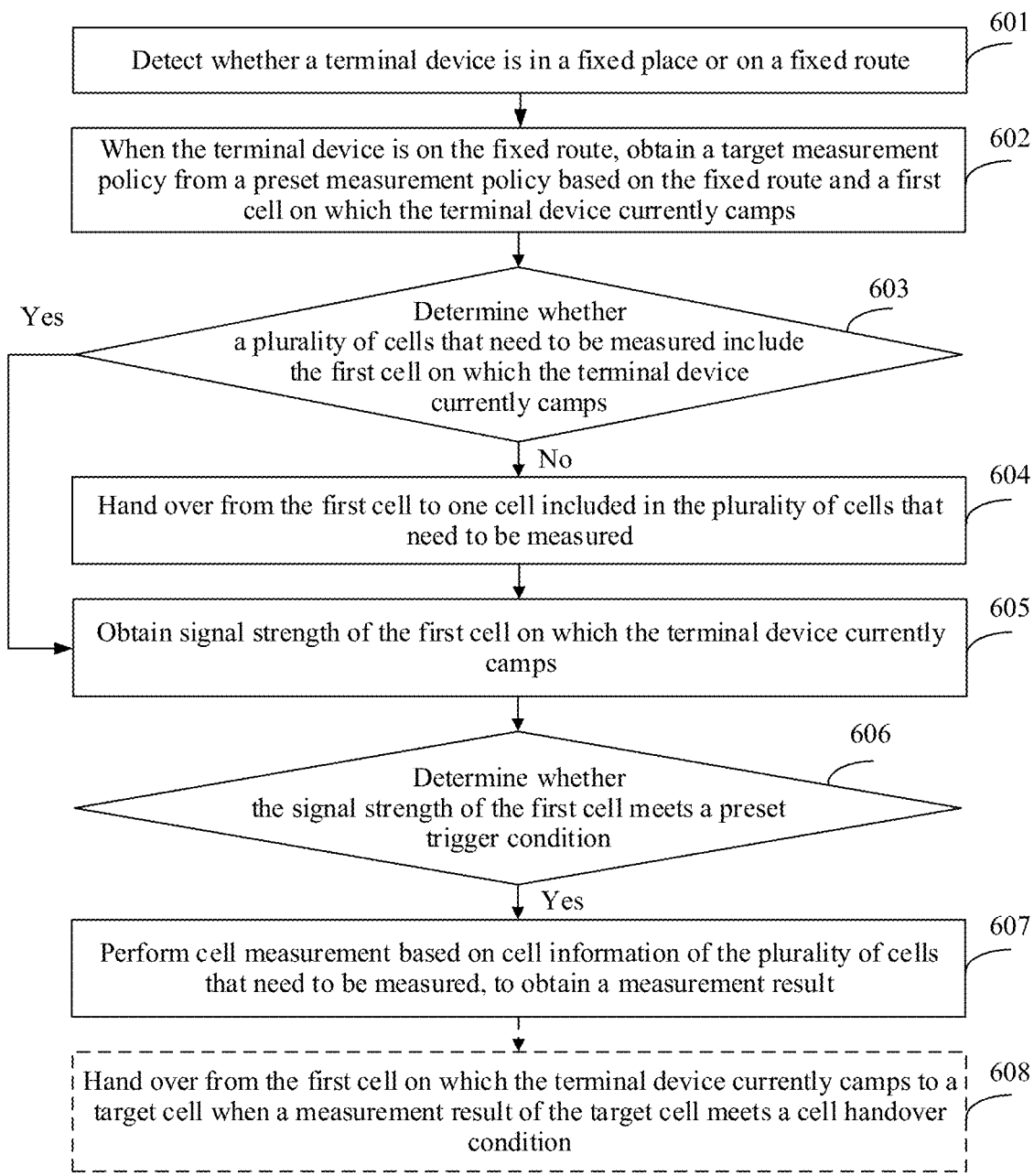
FIG. 6 is a schematic flowchart of another cell measurement method according to an embodiment of this application.

For specific content of the cell measurement in operation 403 and operation 404, refer to the subsequent embodiment shown in FIG. 5 or FIG. 6. Details are not described herein again.

In an embodiment, after operation 402 is performed, operation 405 may be further performed.

405: The terminal device performs measurement on a third cell when the signal strength of the first cell is less than the second threshold.

When the signal strength of the first cell is less than the first threshold, the terminal device may further determine whether the signal strength of the first cell is less than the second threshold. If the signal strength of the first cell is less than the second threshold, the terminal device may perform measurement on the third cell.

In some embodiments, the third cell includes all neighboring cells of the current camped cell, that is, the third cell is the cell that is specified in the existing standard and needs to be measured. In some other embodiments, the third cell includes all neighboring cells except the second cell of all the neighboring cells of the current camped cell. An advantage of this manner is that when the second cell does not meet the cell handover condition, the terminal device can expand a search range.

It may be understood that the first threshold, the second threshold, and the cell information corresponding to the at least one second cell may also be obtained from the target measurement policy. For specific content of the target measurement policy, refer to the embodiment shown in FIG. 5 or FIG. 6. Details are not described herein again.

In some other embodiments, this embodiment of this application may further include: when a measurement result of the second cell meets the cell handover condition, a cell on which the terminal device camps is handed over from the first cell to the second cell; or when a measurement result of the third cell meets the cell handover condition, a cell on which the terminal device camps is handed over from the first cell to the third cell.

According to the foregoing embodiment, a cell corresponding to the target environment may be learned in advance in this application. In this way, if the terminal device is in the target environment, and signal strength of a cell on which the terminal device currently camps is less than the first threshold, cell measurement may be performed based on the learned cell. In this way, invalid measurement can be effectively avoided, and power consumption of the terminal device is reduced.

Technical Solution for Collecting Description Information

Figure 10A:
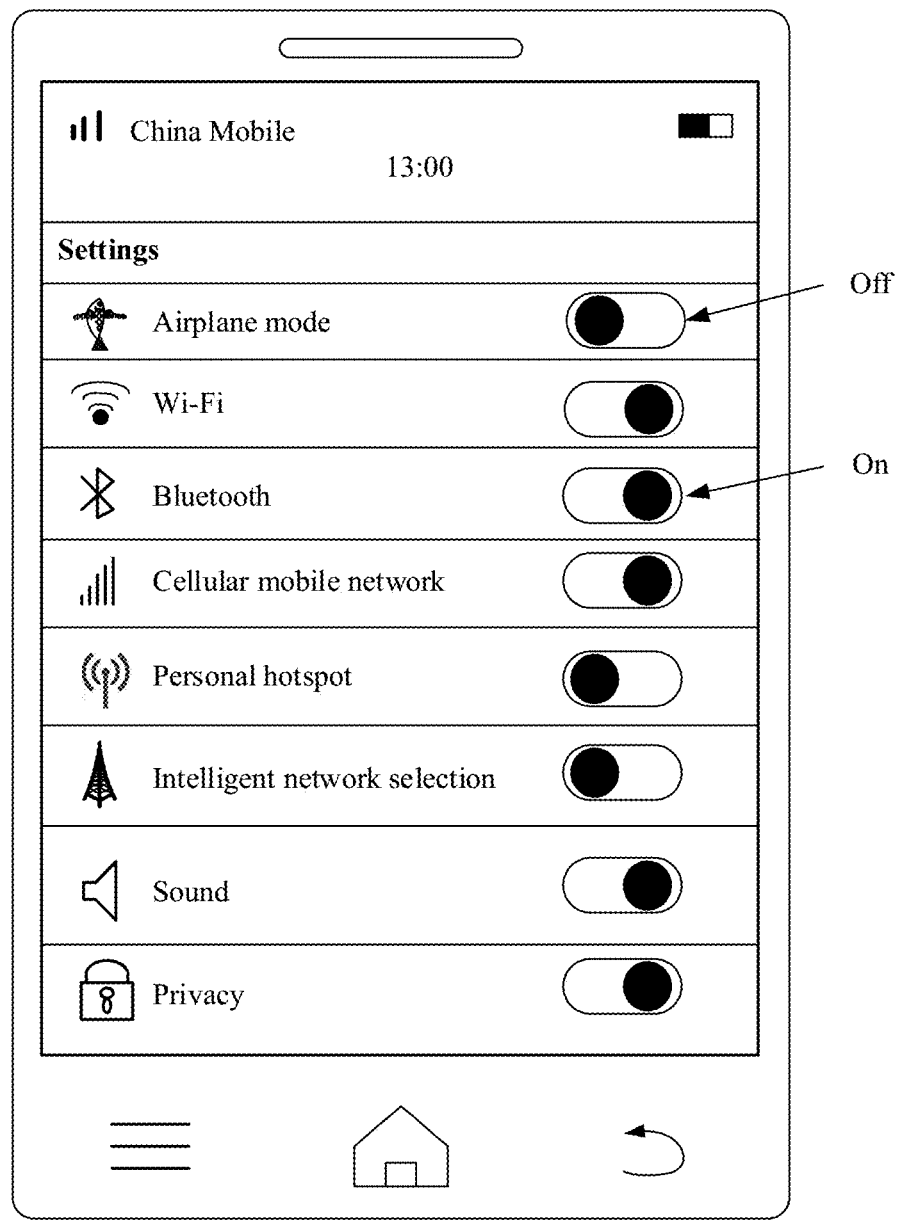
FIG. 10A is a schematic diagram 1 of an interface displayed on a terminal device according to an embodiment of this application.
Figure 10B:
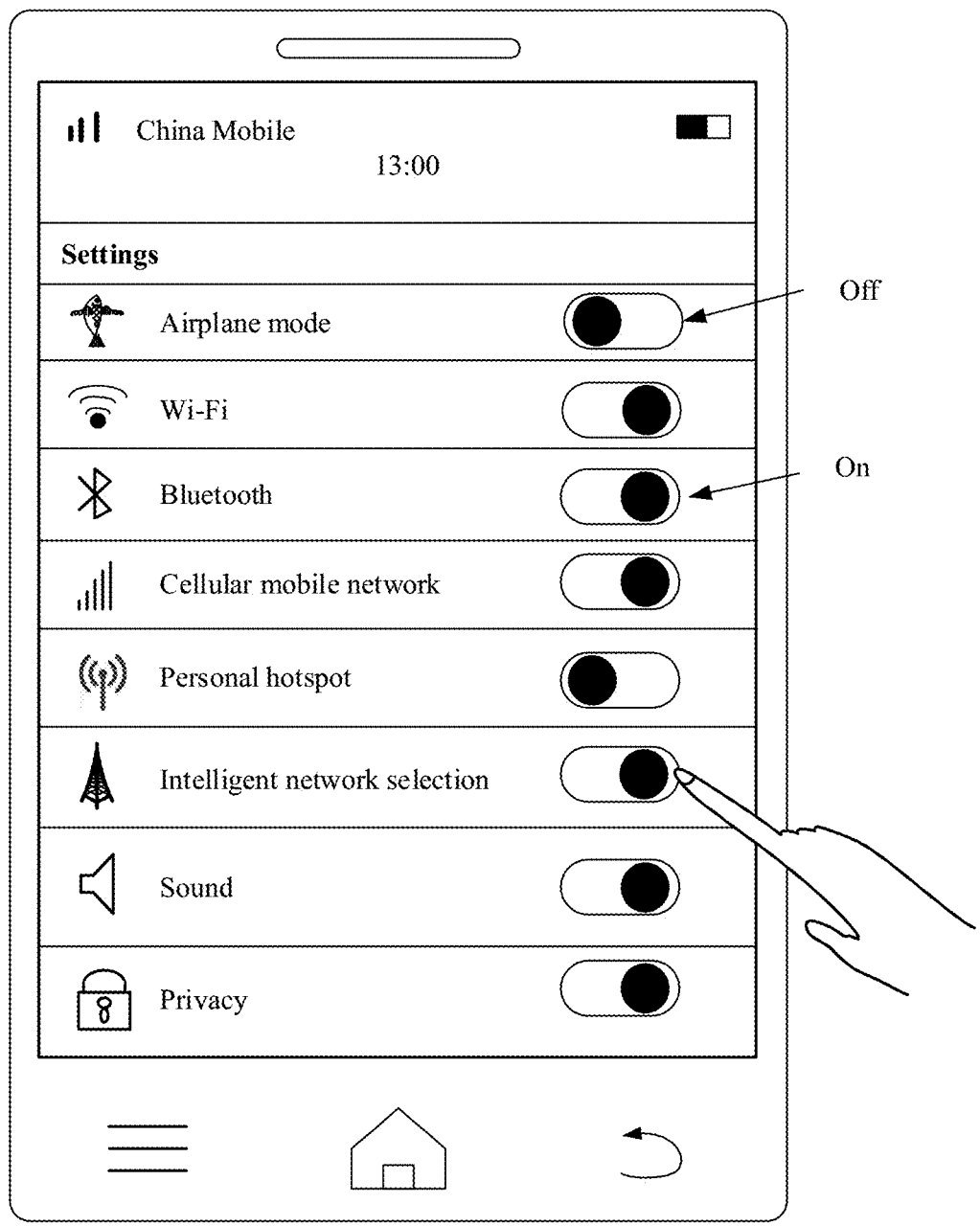
FIG. 10B is a schematic diagram 2 of an interface displayed on a terminal device according to an embodiment of this application.
Figure 10C:
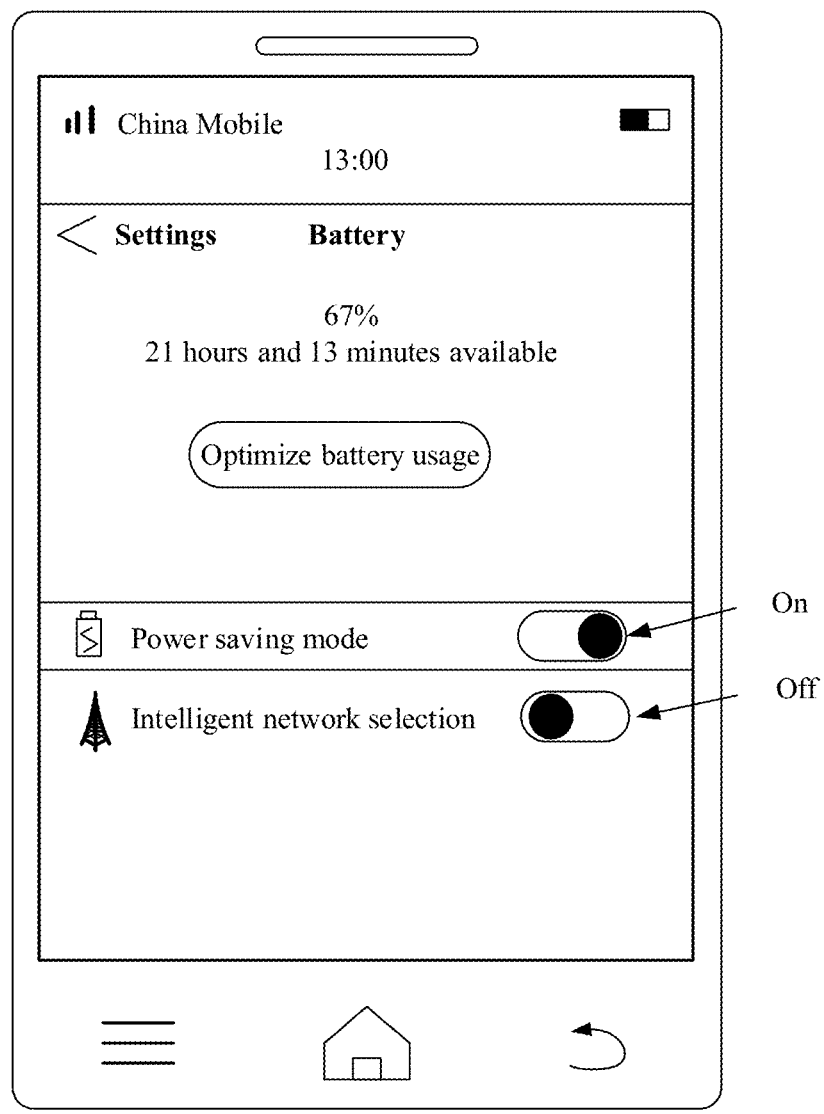
FIG. 10C is a schematic diagram 3 of an interface displayed on a terminal device according to an embodiment of this application.
Figure 10D:
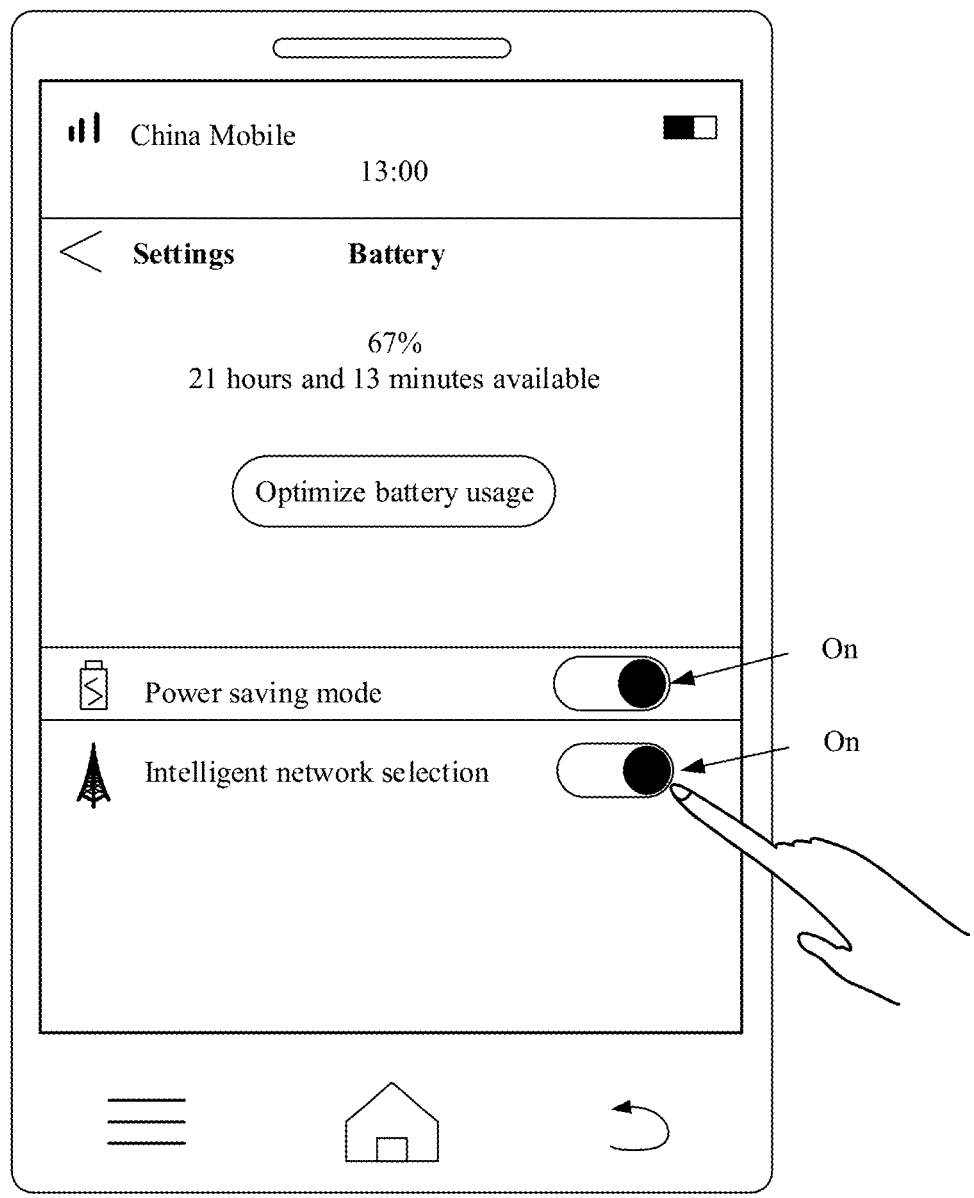
FIG. 10D is a schematic diagram 4 of an interface displayed on a terminal device according to an embodiment of this application.
Figure 10E:
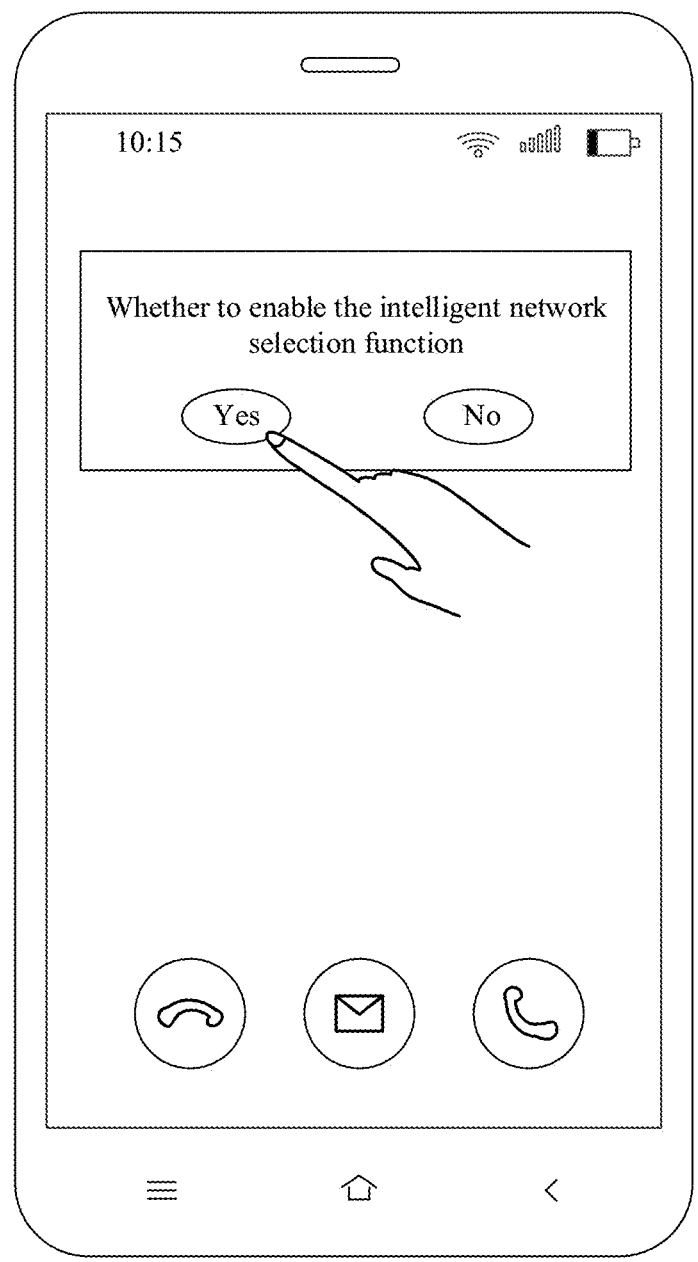
FIG. 10E is a schematic diagram 5 of an interface displayed on a terminal device according to an embodiment of this application.

In some embodiments, the user may enable the intelligent network selection function in the manner shown in FIG. 10B, FIG. 10D, or FIG. 10E, and then the terminal device performs a process of collecting description information in this application. In some other embodiments, the terminal device may automatically collect the description information.

In some embodiments, the terminal device may assume that the user is located in a fixed place within a time period. Therefore, the terminal device may collect description information within the time period. For example, it may be assumed that the user is at home between 2 a.m. and 7 a.m. In this way, the terminal device may collect the description information within the time period.

Certainly, in this application, the terminal device may alternatively collect the description information when the user is located in the fixed place within the time period of a plurality of consecutive days. For example, the terminal device collects the description information within the time period from Monday to Friday.

In some other embodiments, when the user leaves a fixed place, the terminal device may start to collect the description information until the terminal device determines to enter another fixed place. For example, it is assumed that when the user leaves home, the terminal device may start to collect the description information, and stop collecting the description information until the terminal device determines to enter the office. The description information is description information about a route between the home and the office.

In some other embodiments, when the user leaves a fixed place, the terminal device may start to collect the description information. If the terminal device determines, within a specific time period, to enter another fixed place, the description information collected within the time period is reliable description information, and may be used to describe a route between the two fixed places. If the terminal device determines, within a specific time period, that the terminal device does not enter another fixed place, the terminal device stops collecting the description information, and the description information collected within the time period is not reliable description information and cannot be used to describe a route between two fixed places.

For example, it is assumed that when the user leaves home, the terminal device may start to collect the description information. If the terminal device determines to enter the office within 50 minutes, the description information collected within the 50 minutes is reliable description information, and may be used to describe the route between the home and the office.

In some other embodiments, when the user leaves a fixed place within a specific time period, the terminal device may start to collect the description information. For example, if the user leaves home between 7:00 a.m. and 8:00 a.m., the terminal device considers that the user is on a fixed route between the home and the office, and then starts to collect the description information when the user leaves home.

In some other embodiments, the terminal device may assume that the user is on a fixed route within a time period. Therefore, the terminal device may collect description information within the time period. For example, the terminal device may consider that the user is on a fixed route from 8 a.m. to 10 a.m., and therefore may collect description information between 8 a.m. and 10 a.m. The foregoing manner of collecting the description information is merely an example for description, and the manner of collecting the description information is not limited in this application.

In the foregoing embodiment of collecting description information, the collected description information is correspondingly associated with a fixed place or a fixed route.

For example, it is assumed that the fixed place is the home, and the terminal device collects description information of a cell and description information of a Wi-Fi within a specific time period, and associates the description information of the cell and the description information of the Wi-Fi with the home. For example, the terminal device may continuously collect description information of several days, and select closely related description information from the description information. A Wi-Fi name is used as an example for description. It is assumed that the terminal device can detect a Wi-Fi name "My home" in this time period for several consecutive days, and the name may be associated with the home. When the terminal device detects "My home" again, it may be determined that the terminal device is currently located at the fixed place of home.

It should be noted that, in a process of collecting the description information, repeated information may be collected, for example, an identifier of a same cell or a name of a same Wi-Fi may be collected. In this case, a single piece of information may be retained, and repeated information is removed, so as to avoid information redundancy. For example, if names of a same Wi-Fi are collected twice, only one Wi-Fi name may be retained.

The collected description information may include at least one of the description information of the cell and the description information of the Wi-Fi. The description information of the cell may be one or more of an identifier of a serving cell on which the terminal device camps, signal strength of the serving cell, an identifier of a neighboring cell of the serving cell, and signal strength of the neighboring cell. The description information of the Wi-Fi may be one or more of a name of the Wi-Fi to which the terminal device connects, signal strength of the Wi-Fi to which the terminal device connects, a name of another Wi-Fi that can be scanned when the terminal device connects to the Wi-Fi, or signal strength of the another Wi-Fi.

According to the foregoing embodiment, in this application, description information corresponding to at least one of a fixed place or a fixed route may be collected in advance, so that whether the terminal device is in the fixed place or on a fixed route can be accurately identified based on the collected description information.

Technical Solution of Cell Measurement

In some embodiments, a user may enable an intelligent network selection function in the manner shown in FIG. 10B, FIG. 10D, or FIG. 10E, and then the terminal device performs the cell measurement method in this application. In some other embodiments, the terminal device may also automatically perform the cell measurement method shown in this embodiment of this application. In some other embodiments, when the terminal device detects that a network signal quality is relatively poor, the terminal device may prompt the user whether to perform the cell measurement method shown in this embodiment of this application.

FIG. 5 is a schematic flowchart of a cell measurement method according to an embodiment of this application. The method is applied to a terminal device, and may include the following operations.

501: Detect whether the terminal device is in a fixed place or on a fixed route.

It may be understood that the fixed place or the fixed route is related to user behavior. For example, the fixed place is a place that the user frequently moves, for example, a home or an office; and the fixed route is a route that the user frequently travels, for example, a route that the user commutes. For a specific detection method, refer to operation 401. Details are not described herein again.

502: Obtain a target measurement policy from a preset measurement policy when the terminal device is located in the fixed place.

In an optional solution, the terminal device obtains the target measurement policy from the preset measurement policy based on the fixed place and a first cell on which the terminal device currently camps.

The target measurement policy may be generated by a first processor, and then sent to a second processor. The second processor is configured to execute the target measurement policy. The first processor and the second processor may be a same processor, or may be different processors.

The target measurement policy includes a preset trigger condition corresponding to a plurality of cells that need to be measured. It may be understood that the plurality of cells that need to be measured are equivalent to at least one second cell in this application.

Further, the target measurement policy may further include at least one piece of cell information corresponding to the plurality of cells that need to be measured. The cell information corresponding to the plurality of cells that need to be measured includes at least one of frequencies corresponding to the plurality of cells that need to be measured and cell identifiers corresponding to the plurality of cells that need to be measured. Certainly, the target measurement policy may further include at least one of measurement priorities, measurement gaps, and network standards of the plurality of cells that need to be measured.

503: Determine whether the plurality of cells that need to be measured include the first cell on which the terminal device currently camps.

When the plurality of cells that need to be measured do not include the first cell, operation 504 to operation 506 are performed.

When the plurality of cells that need to be measured include the first cell, operation 505 and operation 506 are performed.

504: Hand over from the first cell to one cell of the plurality of cells that need to be measured.

It may be understood that, in this application, cell measurement may be directly performed on the plurality of cells that need to be measured, to hand over to a cell that meets a cell handover condition. Alternatively, in this application, whether cell measurement needs to be performed may be determined by using a measurement start threshold configured in a network. If cell measurement needs to be performed, cell measurement is performed on the plurality of cells that need to be measured, so as to hand over to one cell that meets the cell handover condition.

505: Obtain signal strength of the first cell on which the terminal device currently camps.

In this embodiment of this application, the signal strength may include the following parameter: reference signal received power. Certainly, the signal strength in this application may alternatively be a signal quality value. Correspondingly, a threshold subsequently used may be a threshold corresponding to the signal quality value. The signal quality value may include the following parameters: a signal to interference plus noise ratio, reference signal received power, reference signal received quality, a received signal strength indication, or the like.

506: Determine whether the signal strength of the first cell meets the preset trigger condition.

The preset trigger condition may include but is not limited to the following conditions:

(1) The preset trigger condition includes: The signal strength is less than or equal to a first threshold.

(2) When the target measurement policy includes the measurement priorities of the plurality of cells that need to be measured, the preset trigger condition includes: The current cell is not a cell corresponding to a highest measurement priority in the target measurement policy, and the signal strength is less than or equal to the first threshold.

(3) The preset trigger condition includes: The signal strength is less than or equal to the first threshold, the signal strength is greater than or equal to a second threshold, and the first threshold is greater than the second threshold.

The first threshold and the second threshold are set based on empirical values, and may be adjusted based on an actual requirement of the user. This is not limited in this embodiment of this application.

When the signal strength of the first cell meets the preset trigger condition, operation 507 is performed.

When the signal strength of the first cell does not meet the preset trigger condition, measurement is performed on a third cell. In some embodiments, the third cell includes all neighboring cells of the current camped cell, that is, the third cell is the cell that is specified in an existing standard and needs to be measured. In some other embodiments, the third cell includes all neighboring cells except the second cell of all the neighboring cells of the current camped cell. An advantage of this manner is that when the second cell does not meet the cell handover condition, the terminal device can expand a search range.

507: Perform cell measurement based on the cell information of the plurality of cells that need to be measured, to obtain a measurement result.

In this embodiment of this application, the plurality of cells that need to be measured may be pre-obtained in a plurality of manners.

In an embodiment, the plurality of cells that need to be measured may be cells on which the terminal device camps for relatively long time or for a relatively large quantity of times when the terminal device is located in a fixed place, or cells in which service quality is relatively good.

In another embodiment, the plurality of cells that need to be measured may be first N cells on which the terminal device camps for relatively long time when the terminal device is located in a fixed place, or first N cells on which the terminal device camps for a relatively large quantity of times. N may be a preset value.

If the cell information includes the cell identifier, the terminal device may determine a cell based on the cell identifier, and then perform cell measurement on the cell to obtain the measurement result.

If the cell information includes the frequency, the terminal device may perform cell measurement on a cell corresponding to the frequency to obtain the measurement result.

If the cell information includes the cell identifier and the measurement priority, the terminal device may determine a plurality of cells based on the cell identifier, and then may perform cell measurement on the plurality of cells in descending order of measurement priorities to obtain the measurement result.

If the cell information includes the cell identifier and the measurement gap, the terminal device may determine a cell based on the cell identifier, and then perform cell measurement on the cell based on the measurement gap to obtain the measurement result.

In the conventional technology, if the terminal device is not in a highest network standard supported by the terminal device, in a process of performing cell measurement on a neighboring cell, the terminal device first performs cell measurement in the highest network standard. However, if a network standard supported by the neighboring cell does not include the highest network standard, invalid measurement of the terminal device is caused, and power consumption of the terminal device is relatively high.

However, in this embodiment of this application, when the terminal device detects that the terminal device is not in the highest network standard supported by the terminal device, and the plurality of cells that need to be measured do not support the highest network standard, the terminal device may perform cell measurement based on the network standard in the target measurement policy, where the network standard is not the highest network standard. In this way, the terminal device does not need to perform cell measurement in the highest network standard supported by the terminal device, thereby reducing power consumption of the terminal device.

In an embodiment, after operation 507, operation 508 may be further performed.

508: Hand over from the first cell on which the terminal device currently camps to a target cell when a measurement result of the target cell meets the cell handover condition.

The target cell is one of the plurality of cells that need to be measured.

In an embodiment, to update the target measurement policy, in this application, fitting may be further performed based on the measurement result and a learning result of pre-stored historical data. If a fitting degree of a fitting result is relatively good, the target measurement policy may be optimized. It should be understood that one or more parameters in the target measurement policy may be adjusted in an optimization process. If the fitting degree of the fitting result is relatively poor (for example, no fitting), the target measurement policy is deleted.

According to the embodiment of this application, a measurement policy corresponding to a fixed place can be learned in advance in this application. In this way, if the terminal device is located in a fixed place, and signal strength of a cell on which the terminal device currently camps meets the preset trigger condition, cell measurement may be performed based on a learned target measurement policy. In this way, invalid measurement can be effectively avoided, and power consumption of the terminal device is reduced.

Technical Solution of Cell Measurement

In some embodiments, a user may enable an intelligent network selection function in the manner shown in FIG. 10B, FIG. 10D, or FIG. 10E, and then the terminal device performs the cell measurement method in this application. In some other embodiments, the terminal device may also automatically perform the cell measurement method shown in this embodiment of this application. In some other embodiments, when the terminal device detects that a network signal quality is relatively poor, the terminal device may prompt the user whether to perform the cell measurement method shown in this embodiment of this application.

FIG. 6 is a schematic flowchart of a cell measurement method according to an embodiment of this application. The method is applied to a terminal device, and includes the following operations.

601: Detect whether the terminal device is in a fixed place or on a fixed route.

For specific content, refer to operation 401. Details are not described herein again.

602: When the terminal device is on the fixed route, obtain a target measurement policy from a preset measurement policy based on the fixed route and a first cell on which the terminal device currently camps.

If the terminal device is on the fixed route, the terminal device may obtain the target measurement policy from the preset measurement policy based on the fixed route and the first cell on which the terminal device currently camps.

For specific content of the target measurement policy, refer to operation 502. Details are not described herein again.

603: Determine whether a plurality of cells that need to be measured include the first cell on which the terminal device currently camps.

When the plurality of cells that need to be measured do not include the first cell, operation 604 to operation 606 are performed.

When the plurality of cells that need to be measured include the first cell, operation 605 and operation 606 are performed.

604: Hand over from the first cell to one cell included in the plurality of cells that need to be measured.

For specific content, refer to operation 504. Details are not described herein again.

605: Obtain signal strength of the first cell on which the terminal device currently camps.

For specific content, refer to operation 505. Details are not described herein again.

606: Determine whether the signal strength meets a preset trigger condition.

In this embodiment of this application, the preset trigger condition includes but is not limited to any one of the following:

(1) The preset trigger condition includes: The signal strength is less than or equal to a first threshold.

(2) The preset trigger condition includes: The signal strength is less than or equal to the first threshold, the signal strength is greater than or equal to a second threshold, and the first threshold is greater than the second threshold.

The first threshold and the second threshold are set based on empirical values, and may be adjusted based on an actual requirement of the user. This is not limited in this embodiment of this application.

When the signal strength of the first cell meets the preset trigger condition, operation 607 is performed.

When the signal strength of the first cell does not meet the preset trigger condition, measurement is performed on a third cell. In some embodiments, the third cell includes all neighboring cells of the current camped cell, that is, the third cell is the cell that is specified in the existing standard and needs to be measured. In some other embodiments, the third cell includes all neighboring cells except the second cell of all the neighboring cells of the current camped cell. An advantage of this manner is that when the second cell does not meet the cell handover condition, the terminal device can expand a search range.

607: Perform cell measurement based on cell information of the plurality of cells that need to be measured, to obtain a measurement result.

For a specific process, refer to operation 507. Details are not described herein again.

In an embodiment, after operation 607, operation 608 may be further performed.

608: Hand over from the first cell on which the terminal device currently camps to a target cell when a measurement result of a first target cell meets the cell handover condition.

The target cell is one of the plurality of cells that need to be measured.

In an embodiment, to update the target measurement policy, in this application, fitting may be further performed based on the measurement result and a learning result of pre-stored historical data. If a fitting degree of a fitting result is relatively good, the target measurement policy may be optimized. It should be understood that one or more parameters in the target measurement policy may be adjusted in an optimization process. If the fitting degree of the fitting result is relatively poor (for example, no fitting), the target measurement policy is deleted.

According to the embodiment of this application, a measurement policy corresponding to a fixed route can be learned in advance in this application. In this way, if the terminal device is on a fixed route, and signal strength of a cell on which the terminal device currently camps meets the preset trigger condition, cell measurement may be performed based on a learned target measurement policy. In this way, invalid measurement can be effectively avoided, and power consumption of the terminal device is reduced.

Technical Solution of Network Search

In the conventional technology, when there is no network signal coverage, the terminal device still searches for a network. Such network search consumes a large amount of power and is meaningless. According to the technical solution in this embodiment, a range of a no-network area may be learned in advance, and when it is detected that a terminal device enters the area, network search may be stopped, thereby reducing power consumption.

In some embodiments, a user may enable an intelligent network selection function in the manner shown in FIG. 10B, FIG. 10D, or FIG. 10E, and then the terminal device performs the network search method in this application. In some other embodiments, the terminal device may also automatically perform the network search method shown in this embodiment of this application. In some other embodiments, when the terminal device detects that there is no network signal, the terminal device may prompt the user whether to perform the network search method shown in this embodiment of this application.

Figure 7:
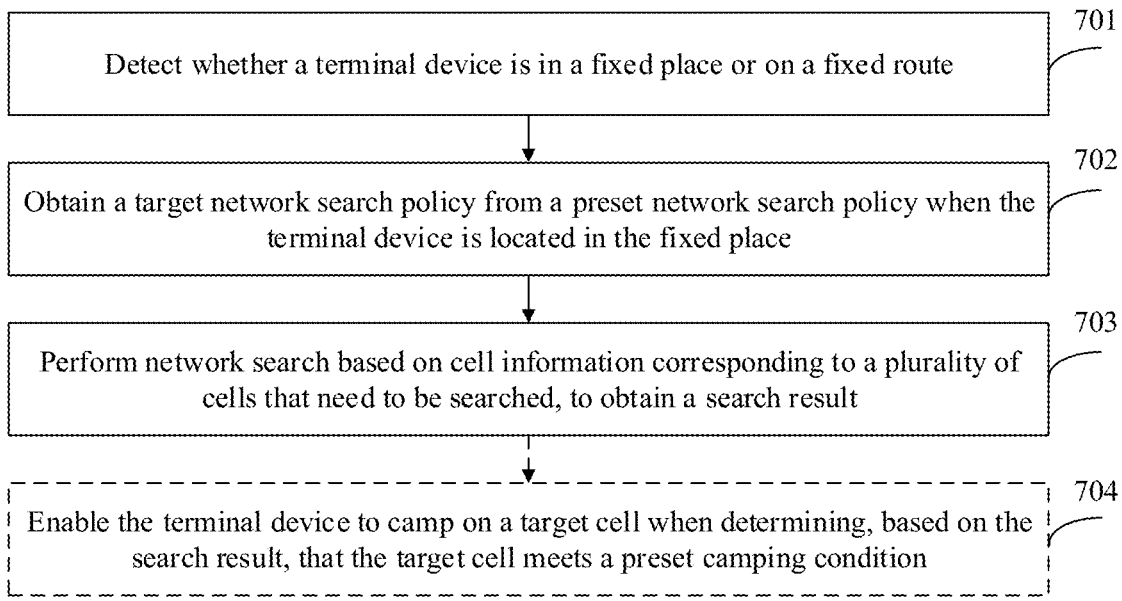
FIG. 7 is a schematic flowchart of a network search method according to an embodiment of this application.

FIG. 7 is a schematic diagram of an embodiment of a network search method according to an embodiment of this application. The method is applied to a terminal device, and may include the following operations.

701: Detect whether the terminal device is in a fixed place or on a fixed route.

In this embodiment of this application, the terminal device may detect, when the terminal device is in a network service unavailable state, whether the terminal device is in the fixed place or on the fixed route. The manners of determining whether the terminal device is in the network service unavailable state may include but are not limited to the following manners:

In an embodiment, the connectivity manager in FIG. 3 sends a first status message to the modem when detecting that a current network status of the terminal device is the network service unavailable state. The first status message is used to indicate that the current network status of the terminal device is the network service unavailable state. Alternatively, the connectivity manager sends a second status message to the modem when detecting that the current network status of the terminal device is a network service available state. The second status message is used to indicate that the current network status of the terminal device is the network service available state. In this way, the modem may determine the current network status of the terminal device based on a status information type.

In another embodiment, the connectivity manager sends a status message to the modem when detecting that the current network status of the terminal device is the network service unavailable state. In this way, the modem determines that the current network status of the terminal device is the network service unavailable state when the modem receives the status message, or the modem determines that the current network status of the terminal device is the network service available state when the modem does not receive the status message.

For example, the network service available state may be a state in which mobile data is connected, a state in which a Wi-Fi is connected, a state in which Ethernet is connected, a state in which Bluetooth is connected, or the like. The network service unavailable state may be a state in which there is no serving cell, a restricted service, a random access failure, or the like. A specific form of the network service state is not specially limited in this embodiment of this application.

It may be understood that the fixed place or the fixed route is related to user behavior. For example, the fixed place is a place that the user frequently moves, for example, a home or an office; and the fixed route is a route that the user frequently travels, for example, a route that the user commutes. For a specific detection method, refer to operation 401. Details are not described herein again.

702: Obtain a target network search policy from a preset network search policy when the terminal device is located in the fixed place.

In an optional solution, the terminal device obtains the target network search policy from the preset network search policy based on the fixed place and a cell on which the terminal device last camps before the terminal device is disconnected from a network.

The target network search policy may be generated by a first processor, and then sent to a second processor. The second processor is configured to execute the target network search policy. The first processor and the second processor may be a same processor, or may be different processors.

The target network search policy may include at least one piece of cell information corresponding to a plurality of cells that need to be searched. The cell information corresponding to the plurality of cells that need to be searched includes at least one of frequencies corresponding to the plurality of cells that need to be searched and cell identifiers corresponding to the plurality of cells that need to be searched. Certainly, the target network search policy may further include at least one of search priorities, search intervals, network search trigger duration, and network standards of the plurality of cells that need to be searched.

It should be understood that the network search trigger duration is used to determine a network search moment. The network search moment may be a moment determined based on a moment at which it is detected that the terminal device is disconnected from a network and the network search trigger duration. For example, the network search moment is obtained by adding the moment at which it is detected that the terminal device is disconnected from a network and the network search trigger duration.

703: Perform network search based on the cell information corresponding to the plurality of cells that need to be searched, to obtain a search result.

In this embodiment of this application, the plurality of cells that need to be searched may be pre-obtained in a plurality of manners.

In an embodiment, the plurality of cells that need to be searched may be cells on which the terminal device camps for relatively long time or for a relatively large quantity of times when the terminal device is located in a fixed place, or cells in which service quality is relatively good, or cells in which a quantity of successful searches is relatively large.

In another embodiment, the plurality of cells that need to be searched may be first N cells on which the terminal device camps for relatively long time when the terminal device is located in a fixed place, or first N cells on which the terminal device camps for a relatively large quantity of times, or first N cells in which a quantity of successful searches is relatively large. N may be a preset value.

If the cell information includes the cell identifier, the terminal device may determine a cell based on the cell identifier, and then perform cell search on the cell to obtain the search result.

If the cell information includes the frequency, the terminal device may perform cell search based on the frequency to obtain the search result.

If the cell information includes the cell identifier and the search priority, the terminal device may determine a plurality of cells based on the cell identifier, and then may perform cell search on the plurality of cells in descending order of search priorities to obtain the search result.

If the cell information includes the cell identifier and the network search trigger duration, the terminal device may determine a cell based on the cell identifier, and then may perform cell search on the cell at the network search moment to obtain the search result.

If the cell information includes the cell identifier and the search interval, the terminal device may determine a cell based on the cell identifier, and then perform cell search on the cell based on the search interval to obtain the search result.

If the cell information includes the cell identifier, the search interval, and the network search trigger duration, after detecting that the terminal device is disconnected from a network, the terminal device performs a network search operation on a historical frequency based on the search interval. If several searches fail, the terminal device terminates the network search operation performed by using the search interval and the historical frequency, and starts to perform network search based on the target network search policy at the network search moment. Alternatively, if any search succeeds in the several searches, the terminal device may camp on a found serving cell. In this way, the serving cell can be found before the network search moment. Therefore, the target network search policy has a deviation. In this case, the target network search policy may be updated in this application. For example, a frequency used for successful searching and a cell identifier of the found serving cell may be used as new learning data. In this way, deep learning may be performed based on the new learning data, to update the target network search policy.

In an embodiment, after operation 703, operation 704 may be further performed.

704: Enable the terminal device to camp on a target cell when determining, based on the search result, that the target cell meets a preset camping condition.

In an embodiment, in this application, the target network search policy may be further optimized based on the search result. It should be understood that one or more parameters in the target network search policy may be adjusted in an optimization process.

In an embodiment, if searching by using the target network search policy fails for a plurality of times, the target network search policy may be deleted.

According to the embodiment of this application, a network search policy corresponding to a fixed place can be learned in advance in this application. In this way, if the terminal device is located in a fixed place and is disconnected from a network, the terminal device may perform network search based on a learned target network search policy. In this way, invalid network search can be effectively avoided, and power consumption of the terminal device is reduced.

Technical Solution of Network Search

In some embodiments, a user may enable an intelligent network selection function in the manner shown in FIG. 10B, FIG. 10D, or FIG. 10E, and then the terminal device performs the network search method in this application. In some other embodiments, the terminal device may also automatically perform the network search method shown in this embodiment of this application. In some other embodiments, when the terminal device detects that there is no network signal, the terminal device may prompt the user whether to perform the network search method shown in this embodiment of this application.

Figure 8:
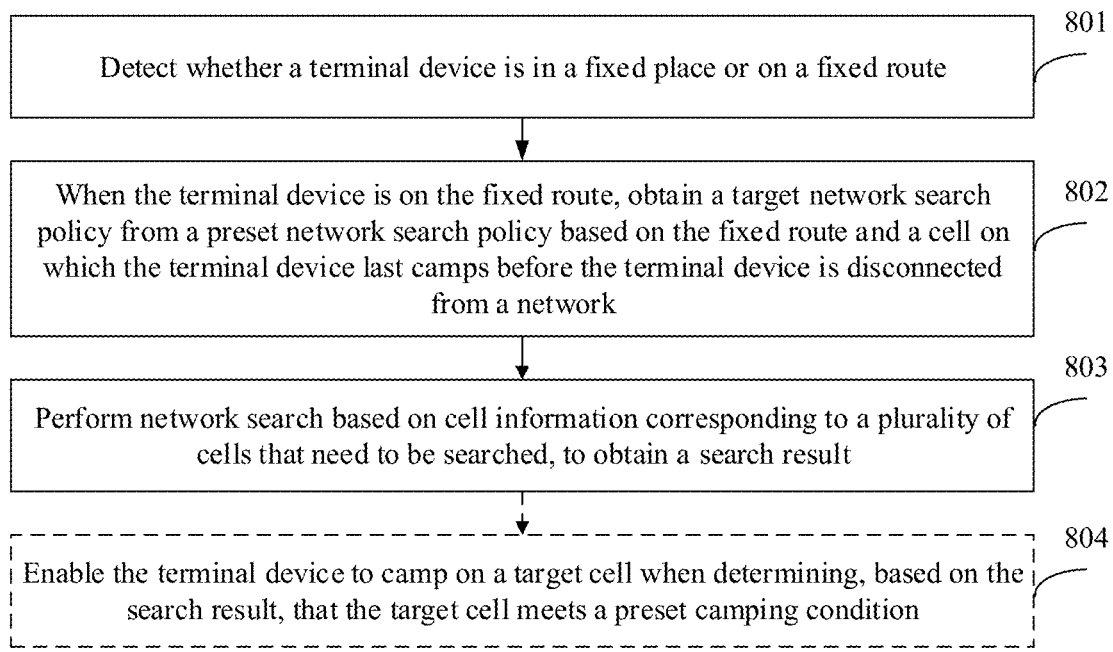
FIG. 8 is a schematic flowchart of another network search method according to an embodiment of this application.

FIG. 8 is a schematic diagram of an embodiment of a network search method according to an embodiment of this application. The method is applied to a terminal device, and may include the following operations.

801: Detect whether the terminal device is in a fixed place or on a fixed route.

For specific content, refer to operation 701. Details are not described herein again.

802: When the terminal device is on the fixed route, obtain a target network search policy from a preset network search policy based on the fixed route and a cell on which the terminal device last camps before the terminal device is disconnected from a network.

For specific content of the target network search policy, refer to operation 702. Details are not described herein again.

803: Perform network search based on cell information corresponding to a plurality of cells that need to be searched, to obtain a search result.

For a specific process, refer to operation 703. Details are not described herein again.

In an embodiment, after operation 803, operation 804 may be further performed.

804: Enable the terminal device to camp on a target cell when determining, based on the search result, that the target cell meets a preset camping condition.

In an embodiment, in this application, the target network search policy may be further optimized based on the search result. It should be understood that one or more parameters in the target network search policy may be adjusted in an optimization process.

In an embodiment, if searching by using the target network search policy fails for a plurality of times, the target network search policy may be deleted.

According to the embodiment of this application, a network search policy corresponding to a fixed route can be learned in advance in this application. In this way, if the terminal device is on a fixed route and is disconnected from a network, the terminal device may perform network search based on a learned target network search policy. In this way, invalid network search can be effectively avoided, and power consumption of the terminal device is reduced.

In the embodiments shown in FIG. 5, FIG. 6, FIG. 7, and FIG. 8, the preset measurement policy and the preset network search policy are involved, and the target measurement policy is involved in the embodiment shown in FIG. 4. It should be understood that the target measurement policy is a preset measurement policy. Therefore, these policies may be learned in advance by using embodiments of this application. For ease of description, the preset measurement policy and the preset network search policy are collectively referred to as a preset network selection policy in this application.

The policy generation method in this application may be applied to a terminal device. The terminal device may include an intelligent network selection main control module, a modem network selection module, and a sensor hub. The intelligent network selection main control module includes an environment awareness unit and a network selection policy interaction unit. It may be understood that the intelligent network selection main control module is equivalent to the first processor in this application, and the modem network selection module is equivalent to the second processor in this application. The preset network selection policy may be generated by the first processor, and then sent to the second processor. The second processor is configured to execute the preset network selection policy. The first processor and the second processor may be a same processor, or may be different processors.

It may be understood that this application may include but is not limited to the following manners of triggering execution of the policy generation method in embodiments of this application.

Manner 1: A primary settings interface of the terminal device includes the intelligent network selection function. In this way, after receiving an instruction for enabling the intelligent network selection function, the terminal device performs the operations of the policy generation method in this application.

For example, as shown in FIG. 10A, on/off controls corresponding to different functions are preset on the primary settings interface of the terminal device. Therefore, different functions may be set based on the on/off controls. For example, in FIG. 10A, an on/off control of an airplane mode is set to an off state, an on/off control of Bluetooth is set to an on state, and an on/off control of an intelligent network selection is set to an off state.

In this case, as shown in FIG. 10B, the user may trigger the on/off control of the intelligent network selection, so that the on/off control of the intelligent network selection is converted from the off state to an on state, and the intelligent network selection function of the terminal device is enabled.

It should be noted that the intelligent network selection function may be further set on a battery settings interface. For example, as shown in FIG. 10C, the intelligent network selection function may be enabled in a power saving mode. In addition, when the power saving mode is in an enabled state, the terminal device displays the on/off control of the intelligent network selection. In this way, as shown in FIG. 10D, the user may trigger the on/off control of the intelligent network selection, so that the on/off control of the intelligent network selection is converted from the off state to the on state, and the intelligent network selection function of the terminal device is enabled.

Manner 2: After being started, the terminal device automatically performs the policy generation method in embodiments of this application.

Manner 3: When detecting that power consumption is relatively high, the terminal device performs the policy generation method in embodiments of this application.

Manner 4: When detecting that power consumption is relatively high, the terminal device presents a prompt box, so that the user determines whether to enable the intelligent network selection function.

For example, as shown in FIG. 10E, because power consumption of the terminal device is relatively high, the terminal device presents a prompt box. The prompt box includes text information "Whether to enable the intelligent network selection function", a "Yes" button, and a "No" button. In this way, when the user triggers the "Yes" button, the terminal device performs the policy generation method in embodiments of this application.

The foregoing manners of triggering execution of the policy generation method in embodiments of this application are merely examples for description. This is not limited in this application. After the policy generation method is determined in the foregoing manner, a policy may be generated by using the following operations:

901: An environment awareness unit obtains description information, network event information, and sensor information that are at different moments in a specified time period.

The description information may include at least one of a name of a Wi-Fi to which a terminal device connects, an identifier of a serving cell on which the terminal device camps, signal strength of the serving cell, an identifier of a neighboring cell of the serving cell, signal strength of the neighboring cell, signal strength of the Wi-Fi to which the terminal device connects, a name of another Wi-Fi that can be scanned when the terminal device connects to the Wi-Fi, and signal strength of the another Wi-Fi. Certainly, the description information may further include other information, for example, further includes but is not limited to at least one of a network standard corresponding to the serving cell, a location area (LA) corresponding to the serving cell, a signal quality value and a discontinuous reception (DRX) periodicity corresponding to the serving cell, a network standard corresponding to the neighboring cell, and signal quality corresponding to the neighboring cell. It should be understood that the neighboring cell may be a single cell or a plurality of cells.

It may be understood that the description information may be obtained in, but not limited to, the following manners:

Manner 1: The environment awareness unit may send a first information obtaining instruction to a modem network selection module before the specified time period arrives. The modem network selection module obtains the description information and the network event information that are at different moments in the specified time period according to the first information obtaining instruction and based on a preset periodicity, and sends the description information and the network event information to the environment awareness unit.

Figure 9:
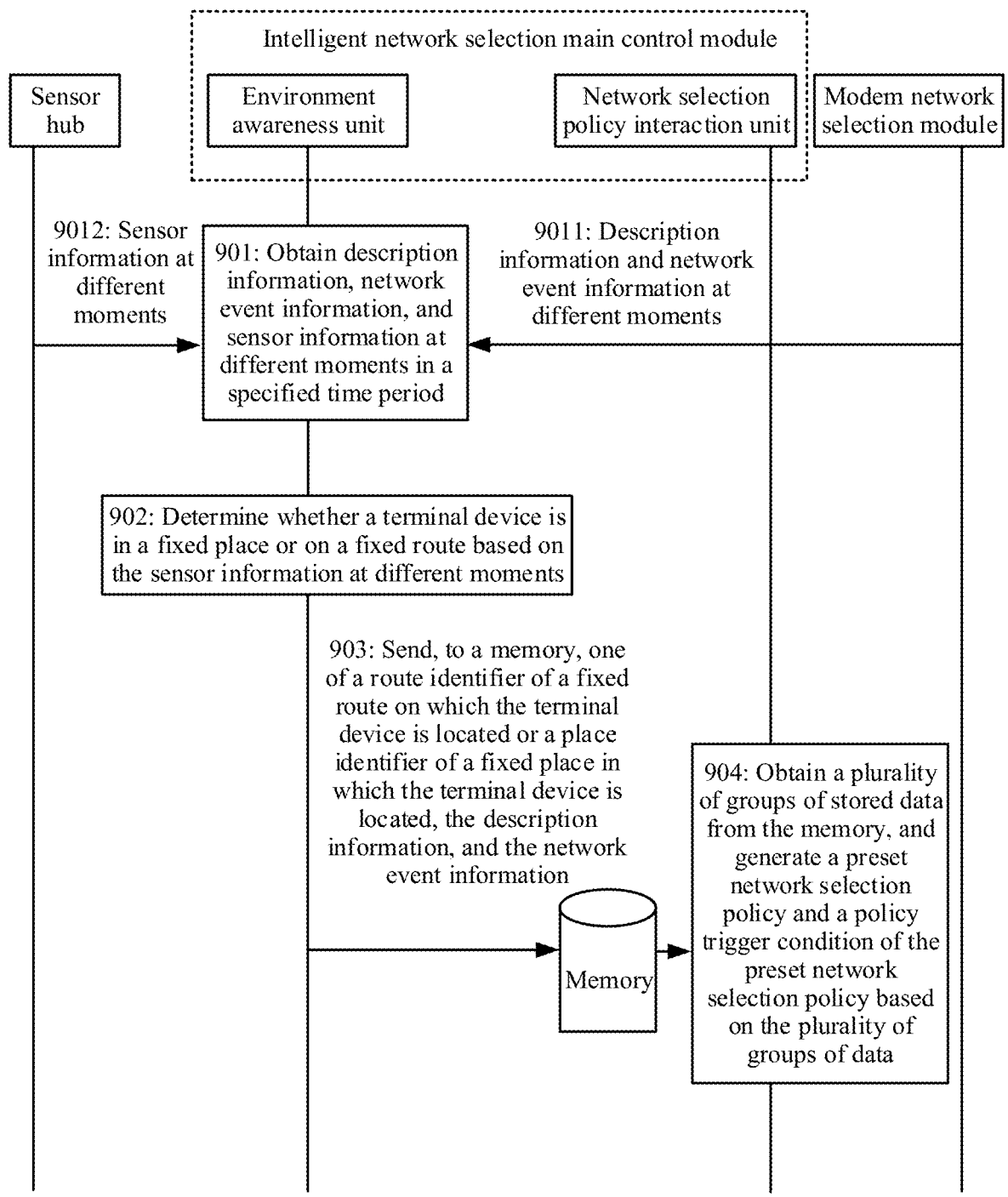
FIG. 9 is a schematic flowchart of a policy generation method according to an embodiment of this application.

Manner 2: The modem network selection module pre-stores the specified time period, obtains the description information and the network event information that are at different moments in the specified time period based on a preset periodicity when the specified time period arrives, and sends the description information and the network event information to the environment awareness unit. As shown in FIG. 9, this operation may include operation 9011: The modem network selection module sends the description information and the network event information to the environment awareness unit.

It may be understood that, in the foregoing two manners, after obtaining description information and network event information that are at each moment in the specified time period, the modem network selection module may send the description information and the network event information that are at each moment to the environment awareness unit. Alternatively, after obtaining description information and network event information that are at a specific moment in the specified time period, the modem network selection module may send the description information and the network event information that are at the specific moment to the environment awareness unit.

It should be understood that event information includes a current connection status of the terminal device. For example, the event information includes a network service available state and a network service unavailable state. The network service available state may be further classified into an idle state and a connected state. The network service unavailable state may be further classified into a no-service state, a limited-service state, and a random access failure state (that is, a base station does not allocate an idle radio resource to the terminal device). The foregoing examples are merely examples for description, and this is not specially limited in this application.

Similarly, the sensor information may be obtained in, but not limited to, the following manners:

Manner 1: The environment awareness unit may send a second information obtaining instruction to a sensor hub before the specified time period arrives. The sensor hub obtains sensor information at different moments according to the second information obtaining instruction and based on a preset periodicity, and sends the sensor information to the environment awareness unit.

Manner 2: The sensor hub pre-stores the specified time period, obtains the sensor information at different moments based on a preset periodicity when the specified time period arrives, and sends the sensor information to the environment awareness unit.

It may be understood that, in the foregoing two manners, after obtaining sensor information at each moment, the sensor hub may send the sensor information at each moment to the environment awareness unit. Alternatively, after obtaining sensor information at a specific moment, the sensor hub may send the sensor information at the specific moment to the environment awareness unit. As shown in FIG. 9, this operation may include operation 9011: The sensor hub sends the sensor information to the environment awareness unit. It should be understood that the sensor information may include location feature data in this application.

The sensor information may be data collected by a built-in environment awareness sensor in the terminal device. The environment awareness sensor may include but is not limited to at least one of the following: a gravity sensor, an acceleration sensor, a gyroscope sensor, and the like. Certainly, the environment awareness sensor in this application may further include another sensor, for example, a global positioning system (GPS) sensor. In this case, information about a GPS positioning point may be obtained through the GPS sensor.

It should be understood that the specified time period may be a time period preset by a user. For example, the user usually works in an office between 9:30 and 11:30, rests at home between 20:30 and 21:30. Therefore, the specified time periods may be set to 9:30 to 11:30 and 20:30 to 21:30.

Figure 11A:
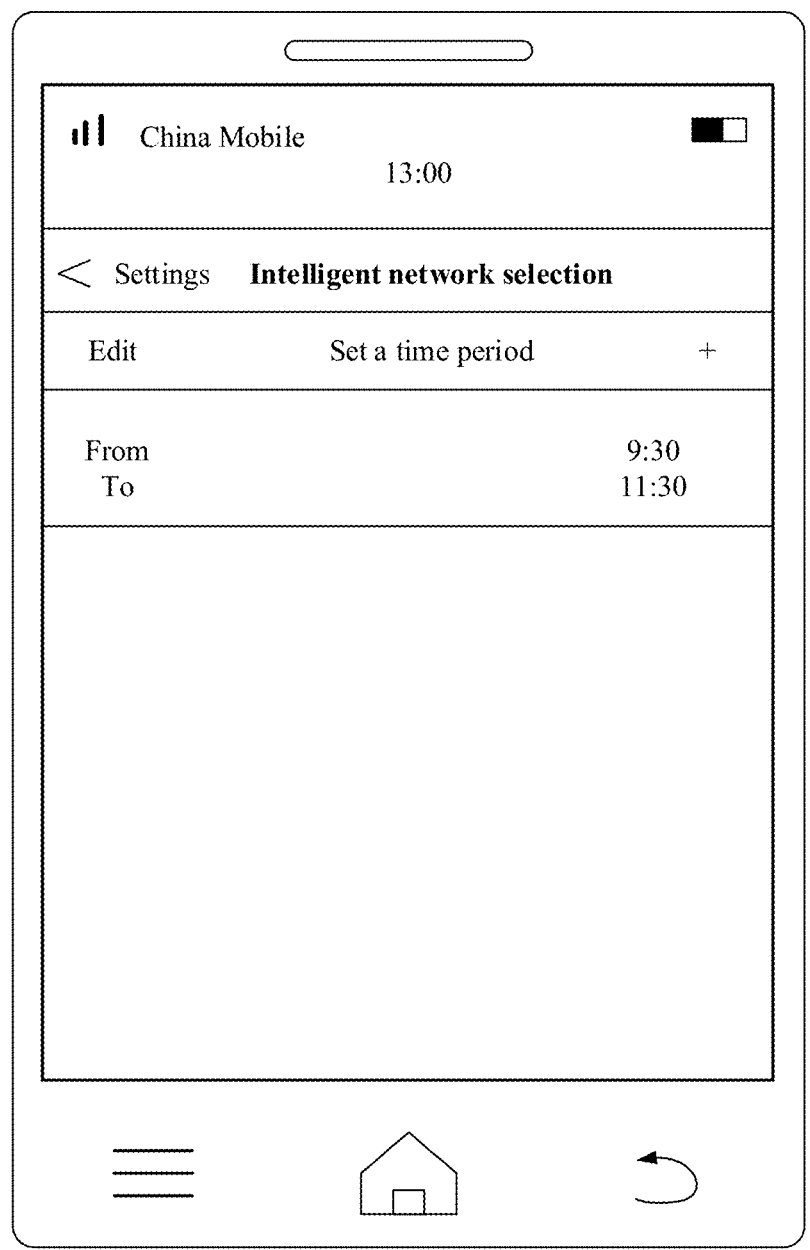
FIG. 11A is a schematic diagram 6 of an interface displayed on a terminal device according to an embodiment of this application.

For example, after the user enables the on/off control of the intelligent network selection, the terminal device displays an intelligent network selection interface. For example, as shown in FIG. 11A, the intelligent network selection interface is used to set a time period. The specified time period 9:30 to 11:30 has been stored in the terminal device.

Figure 11B:
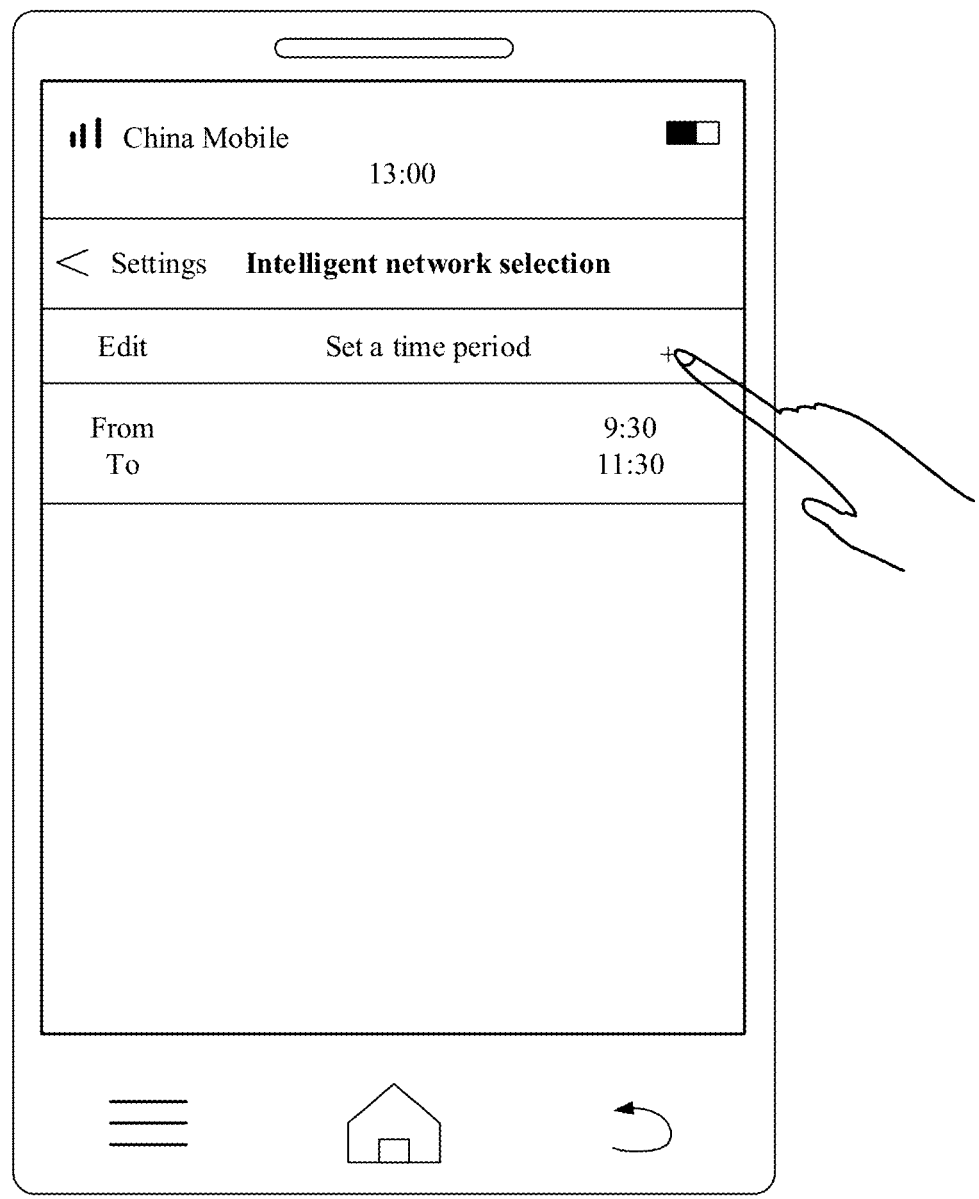
FIG. 11B is a schematic diagram 7 of an interface displayed on a terminal device according to an embodiment of this application.

In this case, as shown in FIG. 11B, the user may trigger a "+" control, to add a new specified time period.

Figure 11C:
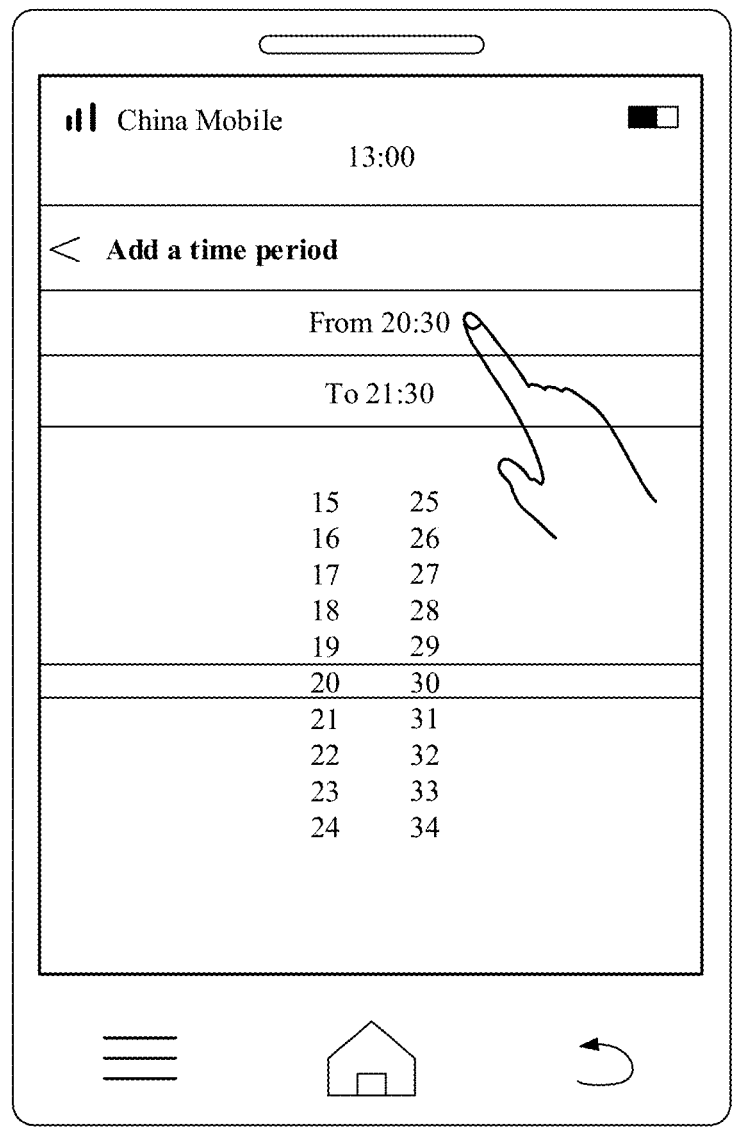
FIG. 11C is a schematic diagram 8 of an interface displayed on a terminal device according to an embodiment of this application.

After the user triggers the "+" control, an interface of the terminal device is shown in FIG. 11C. In this case, if the user triggers a rectangular box in which "from 20:30" is located, a start moment of the specified time period may be determined in an hour list and a minute list displayed on a display of the terminal device.

Figure 11D:
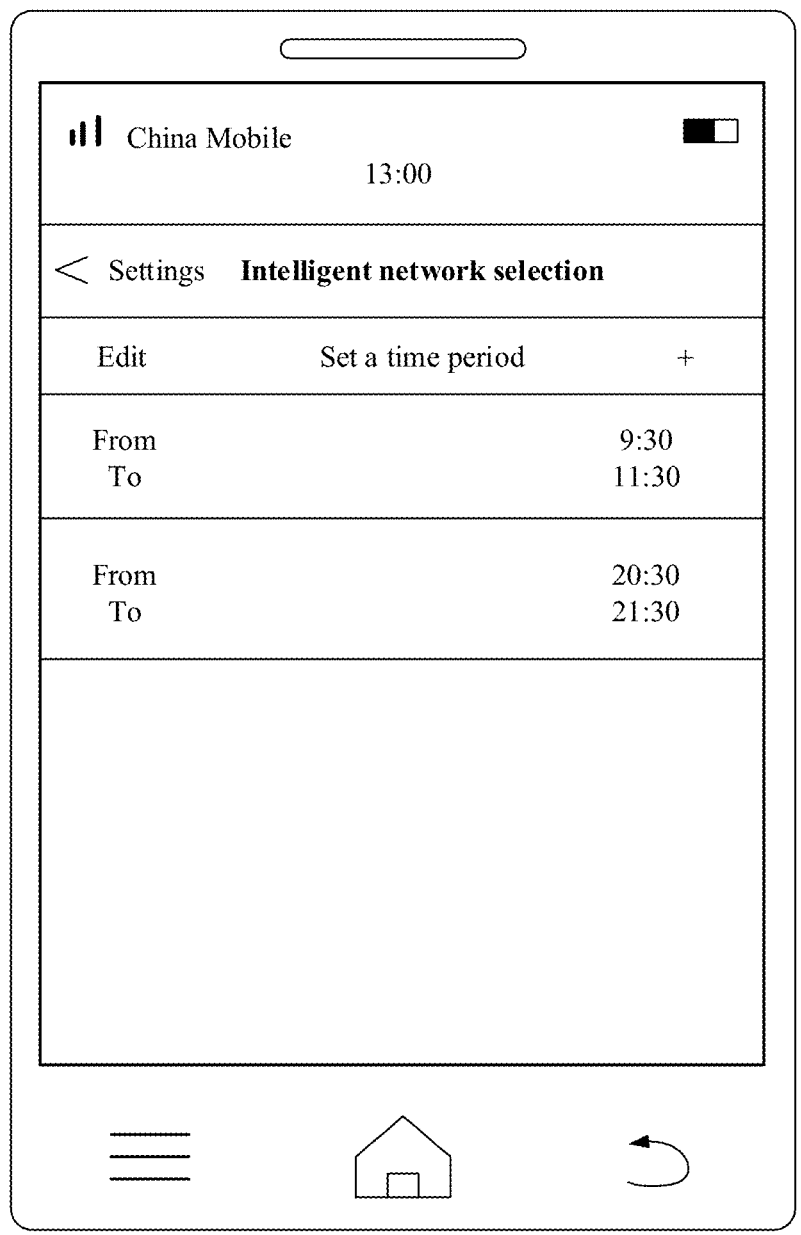
FIG. 11D is a schematic diagram 9 of an interface displayed on a terminal device according to an embodiment of this application.

If the user completes setting the specified time period, the user may return to the intelligent network selection interface. As shown in FIG. 11D, the specified time period includes an originally stored specified time period 9:30 to 11:30 and the newly added specified time period 20:30 to 21:30.

The foregoing manner of setting the specified time period is merely an example for description. This is not limited in this application.

902: The environment awareness unit determines whether the terminal device is in a fixed place or on a fixed route based on the sensor information at different moments.

In some embodiments, location features of the fixed place and the fixed route are different. Therefore, whether the terminal device is in the fixed place or on the fixed route may be identified by using the sensor information. For example, if a location feature fluctuates greatly, the user is on the fixed route; or if a location feature fluctuates slightly, the user is in the fixed place.

In some other embodiments, the terminal device may observe the information about the GPS positioning point collected by the GPS sensor within the specified time period. If the collected GPS positioning point is in an unmoved state for long time, it may be determined that the terminal device is in the fixed place. On the contrary, if the collected GPS positioning point is in a constantly moving state, it may be determined that the terminal device is on the fixed route.

In some other embodiments, in this application, whether the terminal device is on a fixed route or in a fixed place may be further determined based on the description information at different moments. For example, assuming that the description information includes a cell identifier of a current cell on which the terminal device camps, if cells on which the terminal device camps in a time period are a same cell, it may be determined that a place in which the terminal device is located in the time period is a fixed place.

For another example, assuming that the description information includes the cell identifier of the current cell on which the terminal device camps, if the terminal device camps on a relatively small quantity of cells within the specified time period, and camps on each cell for relatively long time within the specified time period, it may be determined that the terminal device camps on a fixed place within the specified time period. If the terminal device camps on a relatively large quantity of cells within the specified time period, and camps on each cell for relatively short time within the specified time period, it may be determined that the terminal device camps on a fixed route within the specified time period.

For another example, assuming that the description information includes a Wi-Fi identifier of a current Wi-Fi to which the terminal device connects, if the terminal device connects to a relatively small quantity of Wi-Fis within the specified time period, and connects to each Wi-Fi for relatively long time within the specified time period, it may be determined that the terminal device camps on a fixed place within the specified time period. If the terminal device connects to a relatively large quantity of Wi-Fis within the specified time period, and connects to each Wi-Fi for relatively short time within the specified time period, it may be determined that the terminal device camps on a fixed route within the specified time period.

In some other embodiments, assuming that the user presets at least one of a fixed place or a fixed route on a positioning map of the terminal, the terminal device may read setting information of the positioning map, and determine a specific fixed place or a specific fixed route based on the setting information.

The foregoing manner of determining whether the terminal device is in the fixed place or on the fixed route is merely an example for description. This is not limited in this application.

903: The environment awareness unit sends, to a memory, one of a route identifier of a fixed route on which the terminal device is located or a place identifier of a fixed place in which the terminal device is located, the description information, and the network event information.

It may be understood that the memory may store a plurality of groups of data, and each group of data includes one of a route identifier of a fixed route on which the terminal device is located or a place identifier of a fixed place in which the terminal device is located, description information, and network event information that correspond to a specific moment.

It should be understood that the memory may associate each group of data with a corresponding fixed place or a corresponding fixed route.

904: A network selection policy interaction unit obtains the plurality of groups of stored data from the memory, and generates a preset network selection policy and a policy trigger condition of the preset network selection policy based on the plurality of groups of data.

It may be understood that, if a network selection policy is generated for a fixed route or a fixed place in this application, a plurality of groups of data associated with the fixed route or the fixed place may be obtained from the memory in this operation.

The measurement trigger condition is described in different cases in this application.

Case 1: When the network event information includes the network service unavailable state, the policy trigger condition includes: The terminal device is on a fixed route or in a fixed place. It is determined that the terminal device is disconnected from a network. A cell on which the terminal device last camps before the terminal device is disconnected from the network is the same as a network disconnected cell associated with a preset network search policy in a learning result.

Case 2: When the terminal device is in the network service available state, the policy trigger condition includes: The terminal device is on a fixed route or in a fixed place. A current cell on which the terminal device camps is the same as a cell associated with a preset measurement policy in a learning result.

It should be noted that for detailed content of the preset network selection policy, refer to the target measurement policy and the target network search policy in FIG. 4, FIG. 5, FIG. 6, FIG. 7, and FIG. 8. Details are not described herein again.

According to this embodiment of this application, the policy trigger condition and the preset network selection policy may be determined in advance for at least one of a fixed place and a fixed route, so that when the policy trigger condition is met, the terminal device may perform network selection processing according to the preset network selection policy. In this way, network selection processing is performed by using the preset network selection policy, so that a loss of the terminal device can be effectively reduced, and network selection efficiency is improved.

Figure 12A:
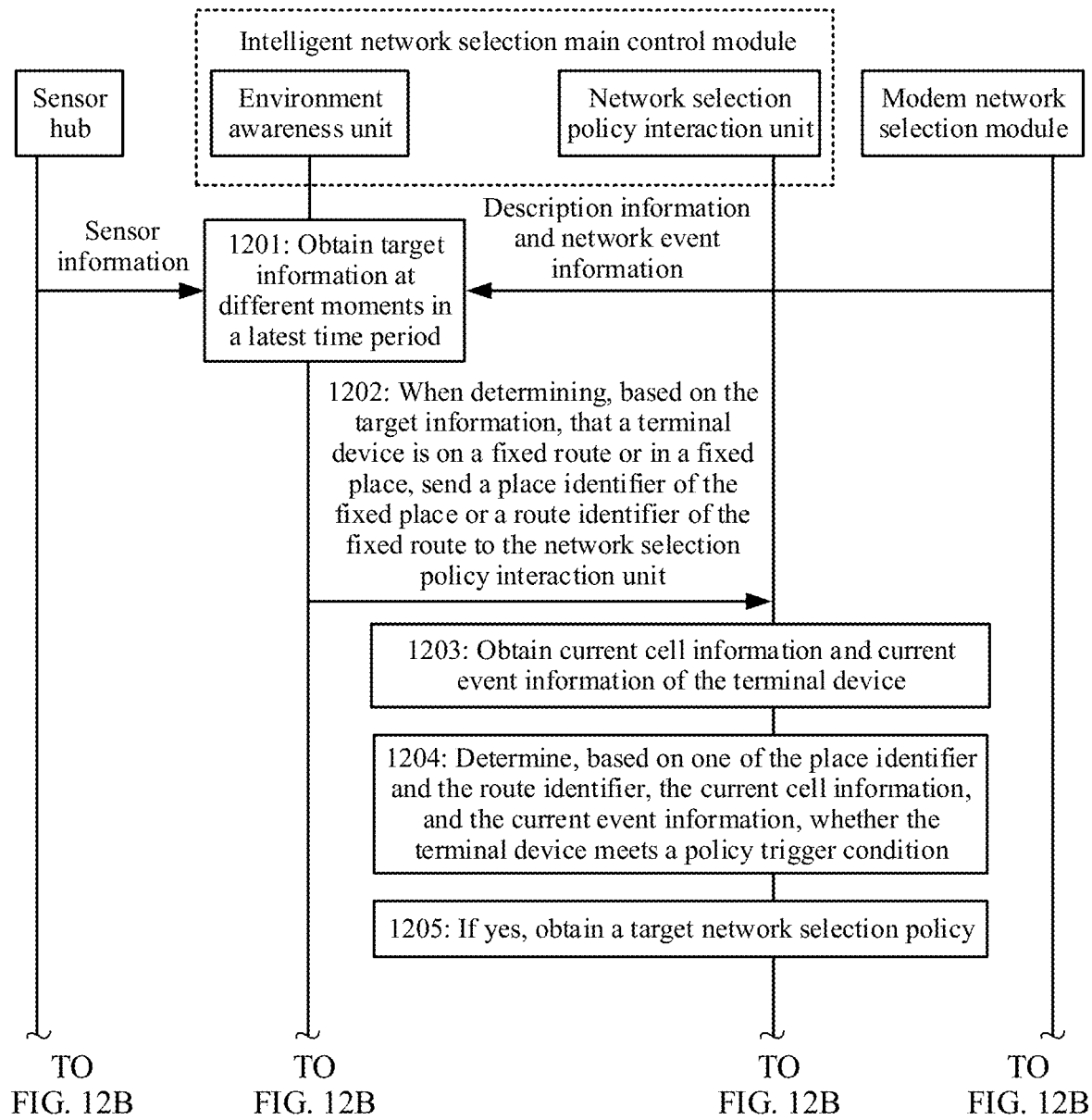
FIG. 12A and FIG. 12B are a schematic flowchart of a network selection method according to an embodiment of this application.
Figure 12B:
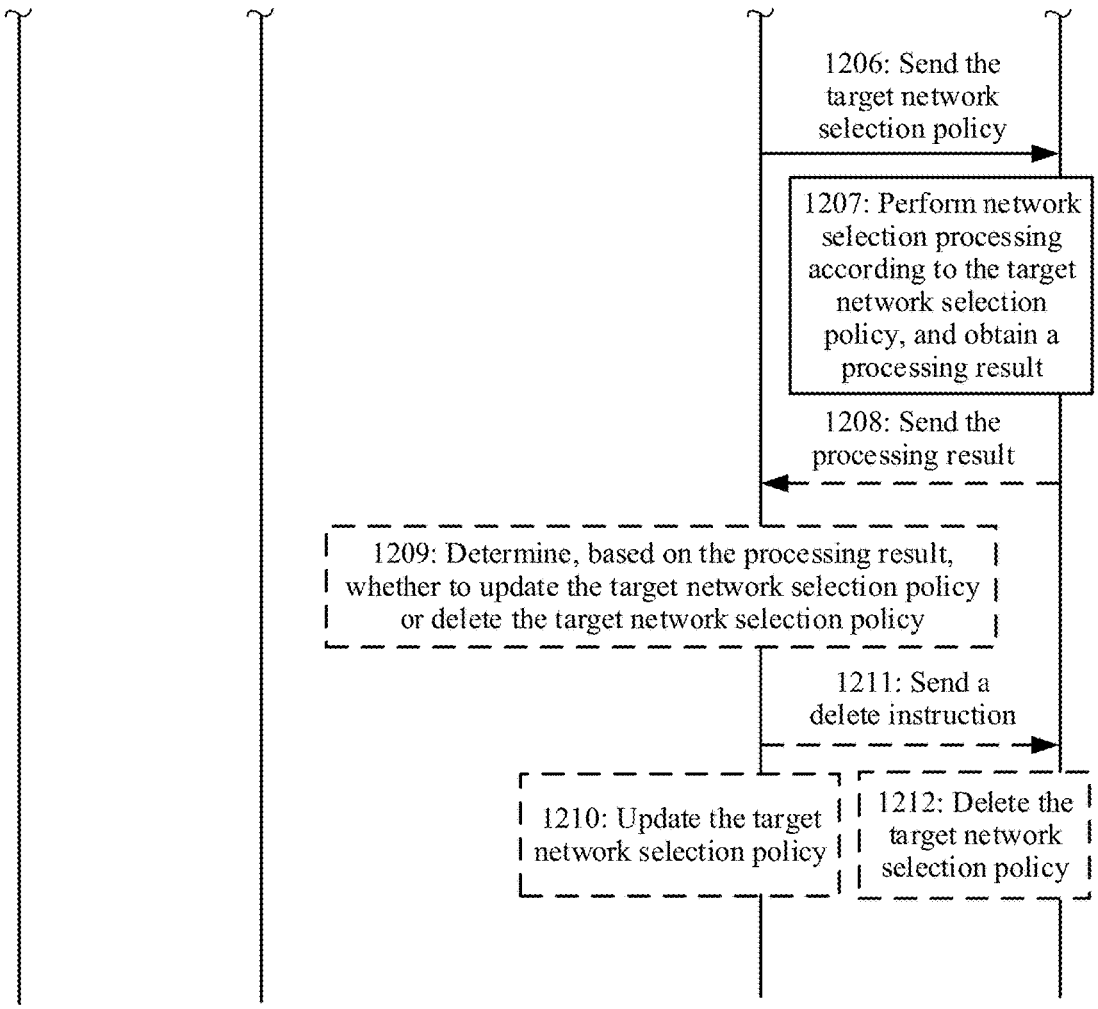

As shown in FIG. 12A and FIG. 12B, an embodiment of this application briefly describes a network selection method. In some embodiments, a user may enable an intelligent network selection function in the manner shown in FIG. 10B, FIG. 10D, or FIG. 10E, and then a terminal device performs the network selection method in this application. In some other embodiments, the terminal device may also automatically perform the network selection method shown in this embodiment of this application. In some other embodiments, when the terminal device detects that network signal quality is relatively poor, the terminal device may prompt the user whether to perform the network selection method shown in this embodiment of this application. A manner of starting a network selection is not limited in this embodiment of this application.

The network selection method in this application may be applied to a terminal device. The method may be used after operation 904 in FIG. 9, and includes the following operations.

1201: The environment awareness unit obtains target information at different moments in a latest time period, where the target information includes sensor information, description information, and network event information.

In an optional embodiment, if the terminal device is in the network service available state, an end moment of the latest time period is the same as a current moment; or if the terminal device is in the network service unavailable state, an end moment of the latest time period is the same as a moment at which it is detected that the terminal device is disconnected from a network.

In this embodiment of this application, for a process of obtaining the sensor information, the description information, and the network event information, refer to operation 901. Details are not described herein again.

1202: When determining, based on the target information, that the terminal device is on a fixed route or in a fixed place, the environment awareness unit sends a place identifier of the fixed place or a route identifier of the fixed route to the network selection policy interaction unit.

Whether the terminal device is in the fixed place or on the fixed route is determined in a plurality of manners. For example, whether the terminal device is in the fixed place or on the fixed route may be detected with reference to the method in operation 401, and details are not described herein again.

1203: The network selection policy interaction unit obtains current cell information and current event information of the terminal device.

It may be understood that an information type of the current event information is the same as the information type of the network event information in operation 901. Details are not described again in this application.

It should be understood that, when the terminal device is in the network service unavailable state, the current cell information includes cell information of the cell on which the terminal device last camps before the terminal device is disconnected from the network; or when the terminal device is in the network service available state, the current cell information includes cell information of the current cell on which the terminal device camps. The cell information may include a cell identifier and at least one of signal strength, a signal quality value, and a frequency.

For a manner of obtaining the current cell information and the current event information of the terminal device, refer to operation 901. Details are not described herein again.

1204: The network selection policy interaction unit determines, based on one of the place identifier and the route identifier, the current cell information, and the current event information, whether the terminal device meets the policy trigger condition.

In this application, the preset network selection policy and the policy trigger condition may be stored in the network selection policy interaction unit in advance. For specific content of the policy trigger condition, refer to operation 904. Details are not described herein again.

When it is determined that the terminal device meets the policy trigger condition, operation 1205 is performed.

When it is determined that the terminal device does not meet the policy trigger condition, back to operation 1201.

1205: The network selection policy interaction unit obtains a target network selection policy.

There is a correspondence between the preset network selection policy and the policy trigger condition. Therefore, in this operation, the target network selection policy corresponding to the policy trigger condition that is currently met by the terminal device may be obtained.

For detailed content of the target network selection policy, refer to the target measurement policy in embodiments shown in FIG. 4, FIG. 5, and FIG. 6 and the target network search policy in embodiments shown in FIG. 7 and FIG. 8. Details are not described herein again.

1206: The network selection policy interaction unit sends the target network selection policy to the modem network selection module.

1207: The modem network selection module performs network selection processing based on the target network selection policy, to obtain a processing result.

For the network selection processing process, refer to embodiments shown in FIG. 4, FIG. 5, FIG. 6, FIG. 7, and FIG. 8. Details are not described herein again.

In an embodiment, after operation 1207, operation 1208 may be further included.

1208: The modem network selection module sends the processing result to the network selection policy interaction unit.

The processing result includes the measurement result in the embodiment shown in FIG. 5 or FIG. 6, or the search result in the embodiment shown in FIG. 7 or FIG. 8.

1209: The network selection policy interaction unit determines, based on the processing result, whether to update the target network selection policy or delete the target network selection policy.

If it is determined to update the target network selection policy, operation 1210 is performed.

If it is determined to delete the target network selection policy, operation 1211 is performed.

1210: Update the target network selection policy.

It should be understood that one or more parameters in the target network selection policy may be adjusted in an update process.

1211: The network selection policy interaction unit sends a delete instruction to the modem network selection module.

The delete instruction is used to indicate to delete the target network selection policy.

1212: The modem network selection module deletes the target network selection policy according to the delete instruction.

It should be noted that the network selection policy interaction unit needs to delete the stored target network selection policy. After the modem network selection module deletes the target network selection policy, network search needs to be performed based on a historical frequency, or cell measurement needs to be performed based on a neighboring cell of a current cell.

According to this embodiment, the intelligent network selection main control module can learn, based on historical information, network selection policies and policy trigger conditions corresponding to different fixed routes or different fixed places. Then, when the terminal device meets the policy trigger condition, the intelligent network selection main control module can send the network selection policy to the modem network selection module, so that the modem network selection module performs network selection processing. In this way, interaction between the intelligent network selection main control module and the modem network selection module is increased, so that the modem network selection module can pertinently perform network selection processing according to the preset network selection policy in a network search policy interaction unit, thereby reducing power consumption of the terminal.

Figure 13:
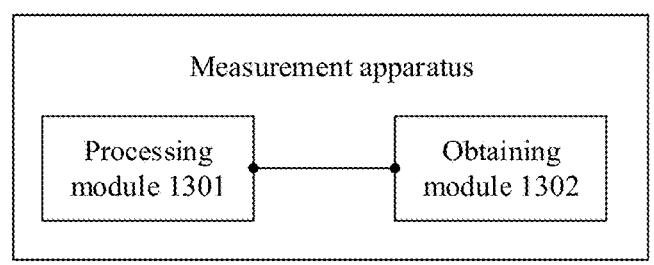
FIG. 13 is a schematic diagram of a structure of a measurement apparatus according to an embodiment of this application.

FIG. 13 is a schematic diagram of an embodiment of a measurement apparatus according to an embodiment of this application. The measurement apparatus may include a processing module 1301 and an obtaining module 1302.

The processing module 1301 is configured to: when a terminal device camps on a first cell, determine that the terminal device is in a target environment.

The obtaining module 1302 is configured to obtain signal strength of the first cell on which the terminal device camps.

The processing module 1301 is further configured to: perform measurement on a second cell when the signal strength of the first cell is less than a first threshold and greater than a second threshold, where the second cell is a cell determined by the terminal device based on the target environment; and perform measurement on a third cell when the signal strength of the first cell is less than the second threshold, where the third cell includes a neighboring cell of the first cell.

In an embodiment, the processing module 1301 may include a first processor and a second processor.

The first processor of the terminal device sends a target measurement policy to the second processor of the terminal device. The first processor is configured to generate the target measurement policy, and the second processor is configured to execute the target measurement policy.

The target measurement policy includes at least one of the first threshold, the second threshold, and cell information corresponding to at least one second cell. The cell information corresponding to the second cell includes at least one of a frequency corresponding to the second cell and a cell identifier corresponding to the second cell.

In an embodiment, the processing module 1301 is configured to: obtain first information; and if the first information matches second information, determine that the terminal device is in the target environment.

The second information is description information of the target environment, and the description information is determined by the terminal device based on the target environment.

In an embodiment, the description information is one or more of a wireless fidelity Wi-Fi name, an identifier of a serving cell, signal strength of the serving cell, an identifier of a neighboring cell of the serving cell, and signal strength of the neighboring cell.

In an embodiment, the processing module 1301 is further configured to: when a measurement result of the second cell meets a cell handover condition, switch a cell on which the terminal device camps from the first cell to the second cell; or when a measurement result of the third cell meets a cell handover condition, switch a cell on which the terminal device camps from the first cell to the third cell.

In an embodiment, the target measurement policy further includes:

a measurement priority corresponding to the at least one second cell.

The processing module 1301 is configured to perform measurement on the second cell based on the measurement priority corresponding to the at least one second cell.

In an embodiment, when the target environment is a fixed place, the description information is information collected by the terminal device during a specified time period, and there is a correspondence between the specified time period and the fixed place.

In an embodiment, when the target environment is a fixed route, the description information is information collected by the terminal device during a period from a moment at which the terminal device leaves a first fixed place to a moment at which the terminal device enters a second fixed place.

It should be noted that the measurement apparatus shown in FIG. 13 may correspondingly perform the operations in the method embodiments shown in FIG. 4 to FIG. 6 and FIG. 12A and FIG. 12B. Details are not described herein again.

In addition, the first processor and the second processor may be a same processor, or may be different processors. In this way, the operations in the method embodiments shown in FIG. 4 to FIG. 6 and FIG. 12A and FIG. 12B may be correspondingly performed by using the first processor and the second processor.

Figure 14:
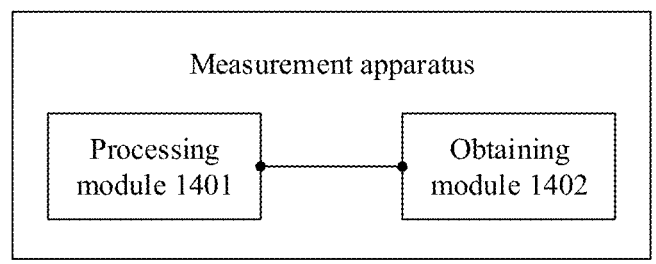
FIG. 14 is a schematic diagram of a structure of a measurement apparatus according to an embodiment of this application.

FIG. 14 is a schematic diagram of an embodiment of a measurement apparatus according to an embodiment of this application. The measurement apparatus may include a processing module 1401 and an obtaining module 1402.

The processing module 1401 is configured to: when a terminal device camps on a first cell, determine that the terminal device is in a target environment.

The obtaining module 1402 is configured to obtain signal strength of the first cell on which the terminal device camps.

The processing module 1401 is further configured to: perform measurement on a second cell when the signal strength of the first cell is less than a first threshold, where the second cell is a cell determined by the terminal device based on the target environment.

In an embodiment, the processing module 1401 may include a first processor and a second processor.

The first processor of the terminal device sends a target measurement policy to the second processor of the terminal device. The first processor is configured to generate the target measurement policy, and the second processor is configured to execute the target measurement policy.

The target measurement policy includes at least one of the first threshold and cell information corresponding to at least one second cell. The cell information corresponding to the second cell includes at least one of a frequency corresponding to the second cell and a cell identifier corresponding to the second cell.

In an embodiment, the processing module 1401 is configured to: obtain first information; and if the first information matches second information, determine that the terminal device is in the target environment.

The second information is description information of the target environment, and the description information is determined by the terminal device based on the target environment.

In an embodiment, the description information is one or more of a wireless fidelity Wi-Fi name, an identifier of a serving cell, signal strength of the serving cell, an identifier of a neighboring cell of the serving cell, and signal strength of the neighboring cell.

In an embodiment, the processing module 1401 is further configured to: when a measurement result of the second cell meets a cell handover condition, switch a cell on which the terminal device camps from the first cell to the second cell.

In an embodiment, the target measurement policy further includes:

a measurement priority corresponding to the at least one second cell.

The processing module 1401 is configured to perform measurement on the second cell based on the measurement priority corresponding to the at least one second cell.

In an embodiment, when the target environment is a fixed place, the description information is information collected by the terminal device during a specified time period, and there is a correspondence between the specified time period and the fixed place.

In an embodiment, when the target environment is a fixed route, the description information is information collected by the terminal device during a period from a moment at which the terminal device leaves a first fixed place to a moment at which the terminal device enters a second fixed place.

It should be noted that the measurement apparatus shown in FIG. 14 may correspondingly perform the embodiments shown in FIG. 4 to FIG. 6 and FIG. 12A and FIG. 12B. Details are not described herein again.

In addition, the first processor and the second processor may be a same processor, or may be different processors. In this way, the embodiments shown in FIG. 4 to FIG. 6 and FIG. 12A and FIG. 12B may be correspondingly performed by using the first processor and the second processor.

Figure 15:
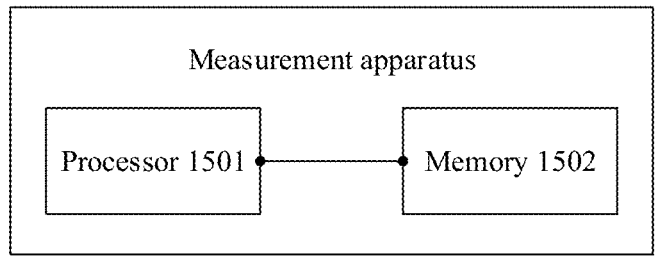
FIG. 15 is a schematic diagram of a structure of a measurement apparatus according to an embodiment of this application.

FIG. 15 is a schematic diagram of an embodiment of a measurement apparatus according to an embodiment of this application. The measurement apparatus may include a processor 1501 and a memory 1502. The processor 1501 is coupled to the memory 1502, the memory 1502 is configured to store computer program instructions, and when the processor 1501 executes the computer program instructions, the measurement apparatus is enabled to perform the embodiments shown in FIG. 4 to FIG. 6 and FIG. 12A and FIG. 12B.

All or some of the foregoing embodiments may be implemented by software, hardware, firmware, or any combination thereof. When software is used to implement the embodiments, all or some of the embodiments may be implemented in a form of a computer program product.

The computer program product may include one or more computer instructions. When the computer program instructions are loaded and executed on a computer, the procedures or the functions according to embodiments of this application are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium that can be stored by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid state drive (SSD)), or the like.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate. Parts displayed as units may or may not be physical units, and may be located in one position or may be distributed on a plurality of network units. Some or all of the units may be selected based on actual requirements to achieve the objectives of the solutions in the embodiments.

In addition, function units in embodiments of this application may be integrated into one processing unit, each of the units may exist alone physically, or two or more units are integrated into one unit. The integrated unit may be implemented in a form of hardware, or may be implemented in a form of a software function unit.

When the integrated unit is implemented in the form of a software function unit and is sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium and includes several instructions for instructing a computer device (which may be a personal computer, a server, or a network device) to perform all or some of the operations of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of embodiments of this application.

What is claimed is:

1. A cell measurement method, wherein the method comprises:
    determining, by a terminal device, a first cell as a camped cell of the terminal device;
    determining, by the terminal device, that the terminal device is in a target environment;
    obtaining, by the terminal device, a signal strength of the first cell;
    performing, by the terminal device, a measurement on a second cell when the signal strength of the first cell is less than a first threshold and greater than a second threshold, wherein the second cell is determined by the terminal device based on the target environment; and
    switching, by the terminal device, the camped cell of the terminal device from the first cell to the second cell when a measurement result of the second cell meets a cell handover condition, wherein the terminal device comprises a first processor and a second processor, wherein the first processor generates a target measurement policy and sends the target measurement policy to the second processor, wherein the second processor executes the target measurement policy.

2. The method according to claim 1,
    wherein the target measurement policy comprises at least one of the first threshold, the second threshold, or cell information corresponding to the second cell; and
    wherein the second threshold is less than the first threshold, and the cell information corresponding to the second cell comprises at least one of a frequency corresponding to the second cell or a cell identifier corresponding to the second cell.

3. The method according to claim 1, wherein the determining, by the terminal device, that the terminal device is in the target environment comprises:
    obtaining, by the terminal device, a first information; and
    determining, by the terminal device, that the terminal device is in the target environment when the first information matches a second information;
    wherein the second information is description information of the target environment, and the description information is determined by the terminal device based on the target environment.

4. The method according to claim 3, wherein the description information comprises at least one of a Wi-Fi name, an identifier of a serving cell, a signal strength of the serving cell, an identifier of a neighboring cell of the serving cell, or a signal strength of the neighboring cell.

5. The method according to claim 1, wherein the method further comprises:
    performing, by the terminal device, a measurement on a third cell when the signal strength of the first cell is less than the second threshold, wherein the third cell comprises a neighboring cell of the first cell; and
    switching the camped cell of the terminal device from the first cell to the third cell when a measurement result of the third cell meets the cell handover condition.

6. The method according to claim 2, wherein the target measurement policy further comprises:
    a measurement priority corresponding to the second cell; and
    wherein the performing, by the terminal device, the measurement on the second cell comprises:
    performing, by the terminal device, the measurement on the second cell based on the measurement priority corresponding to the second cell.

7. The method according to claim 3, wherein when the target environment is a fixed place, the description information is information collected by the terminal device during a specified time period corresponding to the fixed place.

8. The method according to claim 3, wherein when the target environment is a fixed route, the description information is information collected by the terminal device during a period from a moment at which the terminal device leaves a first fixed place to a moment at which the terminal device enters a second fixed place.

9. A terminal device, comprising:
    one or more processors; and
    a memory, wherein the memory stores instructions, which, when executed by the one or more processors, enable the terminal device to perform the following operations:
    determining that a first cell as a camped cell of the terminal device;
    determining that the terminal device is in a target environment;
    obtaining a signal strength of the first cell;
    performing a measurement on a second cell when the signal strength of the first cell is less than a first threshold and greater than a second threshold, wherein the second cell is determined by the terminal device based on the target environment; and
    switching the camped cell of the terminal device from the first cell to the second cell when a measurement result of the second cell meets a cell handover condition, wherein the one or more processors comprise a first processor and a second processor, wherein the first processor generates a target measurement policy and sends the target measurement policy to the second processor, wherein the second processor executes the target measurement policy.

10. The terminal device according to claim 9,
    wherein the target measurement policy comprises at least one of the first threshold, the second threshold, or cell information corresponding to at least one second cell; and
    wherein the second threshold is less than the first threshold, and the cell information corresponding to the second cell comprises at least one of a frequency corresponding to the second cell or a cell identifier corresponding to the second cell.

11. The terminal device according to claim 9, wherein the determining that the terminal device is in the target environment comprises:
    obtaining a first information; and
    determining that the terminal device is in the target environment when the first information matches a second information;
    wherein the second information is description information of the target environment, and the description information is determined by the terminal device based on the target environment.

12. The terminal device according to claim 11, wherein the description information comprises at least one of a Wi-Fi name, an identifier of a serving cell, a signal strength of the serving cell, an identifier of a neighboring cell of the serving cell, or a signal strength of the neighboring cell.

13. The terminal device according to claim 9, wherein the terminal device is further enabled to perform:
   performing measurement on a third cell when the signal strength of the first cell is less than the second threshold, wherein the third cell comprises a neighboring cell of the first cell; and
   switching the camped cell of the terminal device from the first cell to the third cell when a measurement result of the third cell meets the cell handover condition.

14. The terminal device according to claim 10, wherein
   the target measurement policy further comprises: a measurement priority corresponding to the second cell; and
   the performing the measurement on the second cell comprises:
   performing the measurement on the second cell based on the measurement priority corresponding to the second cell.

15. The terminal device according to claim 11, wherein when the target environment is a fixed place, the description information is information collected by the terminal device during a specified time period corresponding to the fixed place.

16. The terminal device according to claim 11, wherein when the target environment is a fixed route, the description information is information collected by the terminal device during a period from a moment at which the terminal device leaves a first fixed place to a moment at which the terminal device enters a second fixed place.

17. A chip, wherein the chip is coupled to a memory in a terminal device, wherein when the chip invokes program instructions stored in the memory, to enable the terminal device to perform:
   determining a first cell as a camped cell of the terminal device;
   determining that the terminal device is in a target environment;
   obtaining a signal strength of the first cell;
   performing a measurement on a second cell when the signal strength of the first cell is less than a first threshold and greater than a second threshold, wherein the second cell is determined by the terminal device based on the target environment, wherein the terminal device comprises a first processor and a second processor, wherein the first processor generates a target measurement policy and sends the target measurement policy to the second processor, wherein the second processor executes the target measurement policy; and
   switching the camped cell of the terminal device from the first cell to the second cell when a measurement result of the second cell meets a cell handover condition.

18. The chip according to claim 17,
   wherein the target measurement policy comprises at least one of the first threshold, the second threshold, or cell information corresponding to at least one second cell;
   wherein the second threshold is less than the first threshold, and the cell information corresponding to the second cell comprises at least one of a frequency corresponding to the second cell or a cell identifier corresponding to the second cell.

19. The chip according to claim 17, wherein the determining that the terminal device is in a target environment comprises:
   obtaining a first information; and
   determining that the terminal device is in the target environment when the first information matches a second information;
   wherein the second information is description information of the target environment, and the description information is determined by the terminal device based on the target environment.

20. The chip according to claim 19, wherein the description information comprises at least one of a Wi-Fi name, an identifier of a serving cell, a signal strength of the serving cell, an identifier of a neighboring cell of the serving cell, or a signal strength of the neighboring cell.

* * * * *